(12) United States Patent
Shevitz

(10) Patent No.: US 10,926,225 B2
(45) Date of Patent: Feb. 23, 2021

(54) HOLLOW FIBER CARTRIDGES AND COMPONENTS AND METHODS OF THEIR CONSTRUCTION

(71) Applicant: Jerry Shevitz, Livingston, NJ (US)

(72) Inventor: Jerry Shevitz, Livingston, NJ (US)

(73) Assignee: Refine Technology, LLC, Pine Brook, NJ (US)

( * ) Notice: Subject to any disclaimer, the term of this patent is extended or adjusted under 35 U.S.C. 154(b) by 0 days.

(21) Appl. No.: 16/261,822

(22) Filed: Jan. 30, 2019

(65) Prior Publication Data

US 2019/0160434 A1 May 30, 2019

Related U.S. Application Data

(62) Division of application No. 14/365,765, filed as application No. PCT/US2012/000582 on Dec. 20, 2012, now Pat. No. 10,213,745.

(60) Provisional application No. 61/579,623, filed on Dec. 22, 2011.

(51) Int. Cl.
| | |
|---|---|
| *B01D 63/04* | (2006.01) |
| *B01D 63/02* | (2006.01) |
| *B01D 65/10* | (2006.01) |

(52) U.S. Cl.
CPC ............ *B01D 63/04* (2013.01); *B01D 63/02* (2013.01); *B01D 63/021* (2013.01); *B01D 63/024* (2013.01); *B01D 63/043* (2013.01); *B01D 65/104* (2013.01); *B01D 2313/02* (2013.01); *B01D 2313/20* (2013.01); *B01D 2313/21* (2013.01); *B01D 2313/23* (2013.01); *B01D 2313/54* (2013.01); *B01D 2317/022* (2013.01); *B01D 2319/04* (2013.01)

(58) Field of Classification Search
CPC .... B01D 63/02; B01D 63/021; B01D 63/024; B01D 63/04; B01D 63/043; B01D 65/104; B01D 2319/04; B01D 2313/02; B01D 2313/20; B01D 2313/21; B01D 2313/23; B01D 2313/54; B01D 2317/022
See application file for complete search history.

(56) References Cited

U.S. PATENT DOCUMENTS

| | | | |
|---|---|---|---|
| 4,038,190 A  * | 7/1977 | Baudet ................... | B01D 46/02 210/321.81 |
| 2005/0161388 A1* | 7/2005 | Williams ........... | B01D 19/0031 210/321.8 |
| 2007/0131605 A1* | 6/2007 | Watari ................. | B01D 63/043 210/321.88 |

* cited by examiner

*Primary Examiner* — John Kim
(74) *Attorney, Agent, or Firm* — Law Firm of Allan Fried; Allan H. Fried

(57) ABSTRACT

Hollow fiber cartridges and components and methods of their construction.

6 Claims, 24 Drawing Sheets

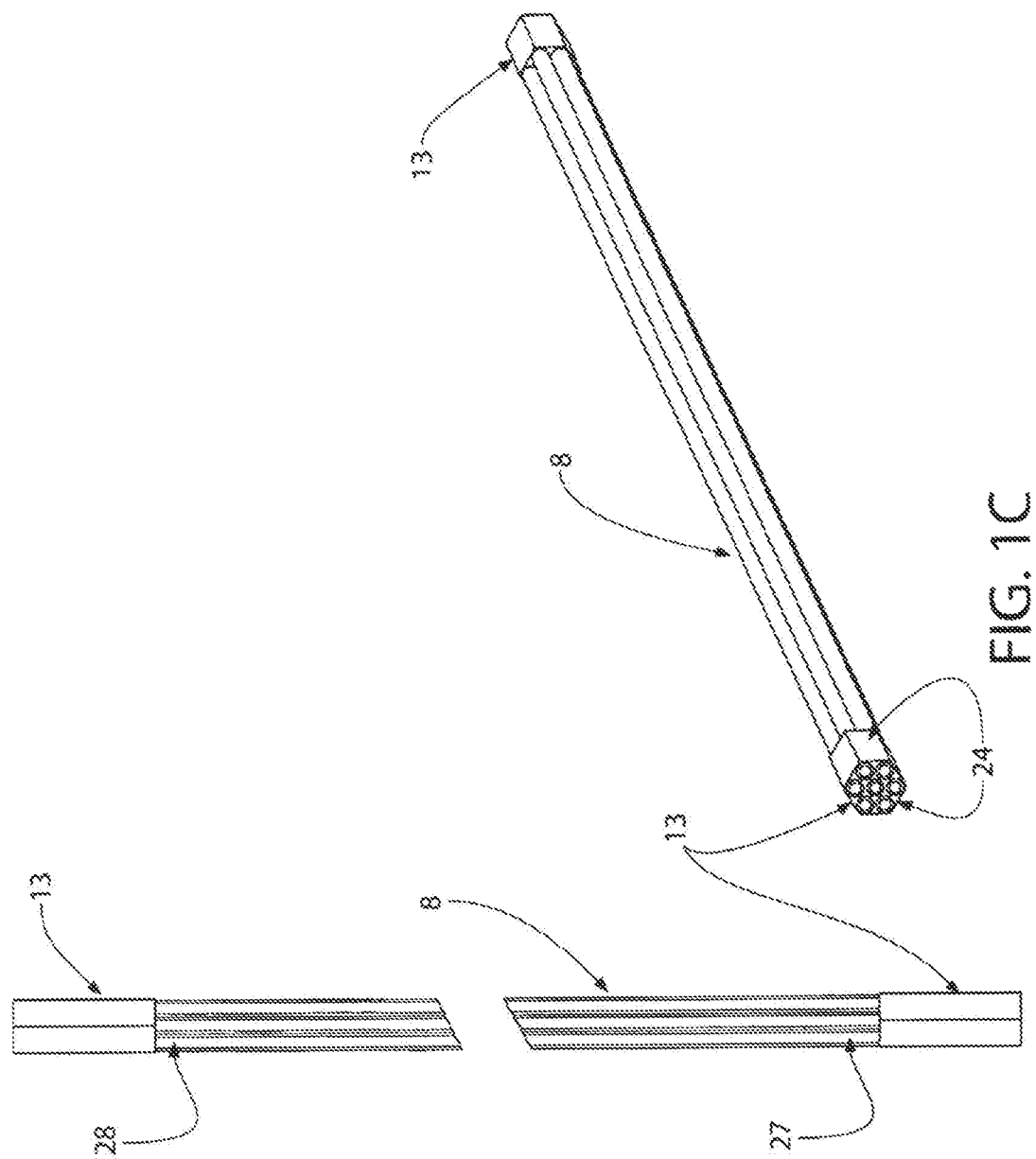

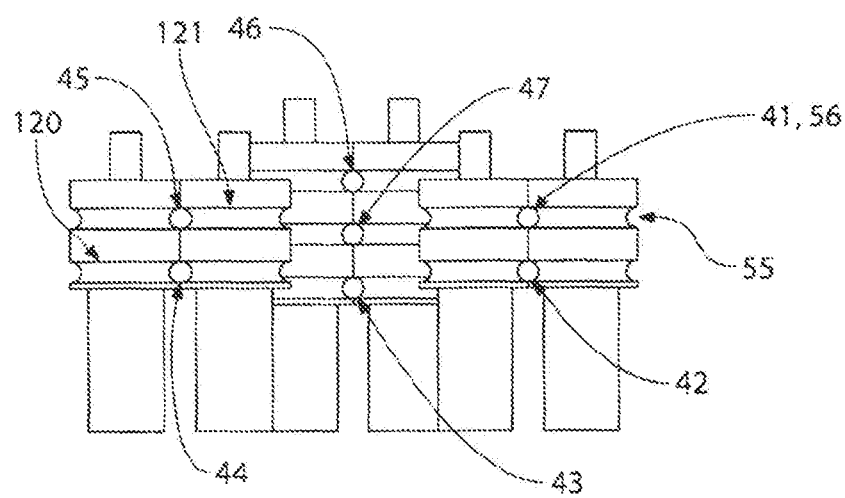

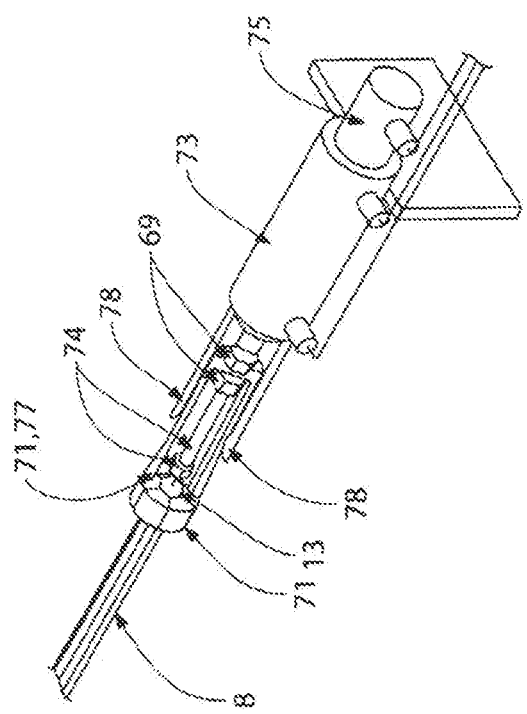

HOLLOW FIBER CARTRIDGES AND COMPONENTS AND METHODS OF THEIR CONSTRUCTION

CROSS REFERENCE TO RELATED APPLICATIONS

This application is a divisional application of U.S. application Ser. No. 14/363,763 filed Jun. 16, 2014, now U.S. Pat. No. 10,213,745, which U.S. application is a National Phase application of PCT International Application No. PCT/US2012/000382, international filing date Dec. 20, 2012, now expired. This divisional application and U.S. application Ser. No. 14/365,765 and said PCT International Application all claim the benefit of U.S. provisional application Ser. No. 61/579,623 filed Dec. 22, 2011. The entire disclosures of the foregoing National Phase application and provisional application are incorporated herein by reference In their entireties.

FIELD OF THE INVENTION

The present invention relates to method of production and assembly of hollow fiber modules.

BACKGROUND OF THE INVENTION

Hollow fiber filters whose walls may be porous and semipermeable possess excellent filtration performance and properties that are applicable in many fields and applications. Hollow fibers (HFs) are used extensively in water purification, separation of constituents from biological fluids, dialysis, reverse osmosis, gas separation, cell culture devices, as well as many others. In spite the variety of uses, hollow fiber based filtration devices have a common structure and mode of operation. The filtration unit is the hollow fiber module (HFM), and while the HFM structure may vary somewhat from one application to another, it nevertheless possesses a generally common structure and method of assembly.

Typically, individual hollow fibers are combined into a "bundle" (also referred to as "clusters") in which fibers may be optionally retained by a sleeve of some kind, typically a net sleeve. The bundle is then further placed in a protective housing or shell which is, typically, tubular in nature. The hollow fibers within the shell, typically, extend about the length of the shell in a manner that disposes the fibers to potting with a polymeric or other material at each end of the shell. The hollow fibers can thus be embedded in the polymeric material upon its polymerization and solidification. In the same process, the solidified potting material, which may be of any thickness, but typically 5-10% the length of the shell, forms a solid end cap, potted cap or "wall" at each end of the shell. The construction results in formation of a chamber between the inner walls of the shell and the outer walls of the hollow fibers, and between the potted end caps.

As the hollow fiber ends may clog during the potting process, known methods are applied either to protect the ends of the hollow fibers from clogging during potting or to open such ends after potting. A continuous flow path is therefore retained through the entire length of the hollow fibers, including through the polymeric potting material. The objective being not only to maintain a continuous flow path through the entire length of the hollow fibers, but also to form a chamber, a permeate chamber, within the shell for storing or collecting fluids emanating from the fiber walls; such an assembly is known as a Hollow Fiber Cartridge (HFC).

Typically, adapters are added to the ends of the shell or HFC which direct the fluid to be filtered or retentate into the hollow fibers at one end and to direct such fluid exiting the hollow fibers at the other end of the HFC. Additional adapters may be added to the shell to provide a conduit from the permeate chamber for collecting such permeate.

Apparent from the generalized structure, having both an inlet and outlet to flow the retentate and a means for collecting filtered material is that the HFM provides an efficient unit of filtration. In the HFM, retentate is directed into the semipermeable HFs, generating a linear flow through the fibers. A higher pressure within the fibers relative to the filtrate chamber generates a second flow, through HF porous walls, perpendicular to the first fluid or retentate flow direction. The fluid fraction traversing the membrane may be fractionated or filtered based on membrane properties, such as, membrane pore size; particles larger than the pores are retained by the membrane and particles smaller than the pores pass through the membrane into the permeate chamber. Such a filtration process is known as cross flow filtration, or tangential flow filtration, which is used extensively and is generally well understood. Liquid filtered through the HF membrane can therefore be collected in the permeate chamber where it may be harvested.

The HFC lacks the adapters for directing retentate inflow and outflow to and from the hollow fibers. However, the cartridge shell wall can be rendered permeable to the unrestricted flow of permeate. Furthermore, the cartridge may be converted to an HFM by its insertion into a separate, module housing which contains such adapters for directing retentate inflow and outflow. It is obvious, however, that when creating such an HFM, a partition is required between the retentate chamber (the collective inner lumens of the fibers) and the permeate (or filtrate) chamber, which separation is readily accomplished with gaskets, "O" rings, or other well-known means, circumscribing the ends of the cartridge and sealing the gap between those ends and the module housing. Additionally, the module housing also contains a harvest port for collecting filtrate emerging from the hollow fibers; pores in the HFC shell provide the means for such filtrate to flow across the cartridge shell wall to the harvest ports for harvest. Because of their similarities, the term HFCM is used when referring to features contained in both HFC and HFM.

The diversity of the HFM can be greatly increased by the selection of hollow fiber material, physical configuration of the HFM, adjustment of the chemical and physical properties of the fibers, regulation of the process of filtration by controlling the flow through and across the fibers and by other manipulations.

The HFM may also provide an excellent platform for scale up. By increasing the number of fibers in the HFC, a volumetric scale up can be achieved. Large filters with densely packed fibers may provide significant benefits, including an obvious increase in membrane surface area, where the increase is to the third power of the radius of the HFC. In comparison, only a linear increase in surface area is achieved by simply adding more HFM to a manifold of such modules. Additionally, one large filter can greatly reduce the foot print of the filtration system, eliminating some of the complexity of a filter manifold. The complexity of the manifold with its interconnecting tubing, pipes, valves, and monitoring instruments, greatly complicates cleaning, sterilization, and validation of a process using such a complex system. These are critical issues in certain industries, including the pharmaceutical, food, chemical, water, sewage treatment, etc. Furthermore, when scaling up a process, transitioning from a smaller scale process containing a single HFM to a larger scale system containing multiple modules may complicate a critical process.

Large scale filters are desirable in many fields primarily for processing large volumes of fluids, for filtering complex mixtures and for increasing rates of filtration. Yet, in spite of the need and benefits for large HFMs, such modules are not readily available. Technical construction limits of such large filters may be involved. While typical construction methods result in reliable "small to moderate" scale HFM, <10 m$^2$ (for a 60 cm long fiber, and 1 mm ID), they become unreliable and costly when applied to production of large filters, where large scale may be >10 m$^2$ (for a 60 cm long fiber, and mm ID). More specifically, the complications increase for a HFM (with the same parameters) with membrane surface area >20 m$^2$, and increase even more with even larger filters. It would be desirable therefore to develop a process for constructing a large HFM that would eliminate or minimize the problems observed by current HFM construction methods. While it is possible to increase surface area with narrower and/or longer fibers, those options may not be desirable in many applications. Some factors associated with the limits to forming large filters, include:

Potting material—The potting material used to embed the HFs at each end of the HFC is a common source of potential problems which can become more severe as the diameter of the HFC increases. For example, potting materials, including epoxies and polyurethane, shrink somewhat after curing. The degree of shrinkage will depend greatly on the material, including its exposure and reaction to heat, moisture, chemicals, radiation, etc; where such shrinkage or change in shape may be very small and insignificant when constructing a small diameter HFM; but, it becomes very significant with increased diameter of the potted area; noting that total shrinkage is a function of the material shrinkage coefficient times length or diameter of the pot. One can appreciate that such shrinkage can affect overall diameter of the pot. It can cause structural failures such as cracking in the pot and/or forcing the pot to shrink inward, towards the center of a rounded potted area or along stress boundaries. This is particularly observed when a potting agent and the shell end cap of the HFC are different materials, each having different expansion and shrinkage properties (i.e. coefficients of thermal expansion) (preferably the shell end cap and the shell have identical coefficients of thermal expansion). For example, in the case where the shell end cap is polysulfone and the potting material is epoxy, the bond between the polysulfone and epoxy may be affected differently by heat treatment, as is the case when heat sterilizing the HFCM in an autoclave. What is frequently noted is that the epoxy, with greater shrinkage than polysulfone, will pull away from the polysulfone to form a passageway between the filtrate chamber and the retentate chamber, compromising the integrity of the HFCM and rendering the HFCM useless. This is observed on occasion in a HFCM of about 4" in diameter and is more frequently observed in a 6" diameter HFCM.

Similarly, when dealing with two different materials with different coefficients of expansion, it becomes problematic to form a secure bond between the two materials, particularly following exposure to heat. Both materials will expand and contract differently, stressing the bond in between them. Selection of materials with similar coefficients of expansion and using techniques to enhance the bond between the two materials may be used to support the stability of the bond; nevertheless, this becomes more difficult to control with increased diameter of the HFC. Thus, it would be desirable to form an HFC or HFM where such incompatibility between different materials of construction is minimized or eliminated.

Packing density—The packing methods of individual fibers or fiber bundles within the HFC can have a great effect on the number of fibers that may be packed in a given volume. The packing method may also have a profound effect on filtration efficiency and on the uniformity of filtrate formation. A tight, randomly packed bundle may result in a higher filtration rate per fiber on the periphery of the bundle, than from fibers in the internal confines of the bundle, particularly in a tight pack, where there may be significant resistance to filtrate flow by the intervening fibers. In a large HFM or HFC, such restrictions may result in reduced effective filtration rate and filtration capacity, thereby reducing the effective scale up capacity. Therefore, it would be desirable to pack individual fibers or fiber bundles in arrangement(s) that maximize fiber packing density and minimize the potential obstructions to filtrate flow. Other benefits to controlled fiber packing arrangements will be described.

Structural—As the size of the HFM is increased, a proportional increase in stress forces acting on the module are expected. Increased stresses based on the following may be expected: Weight—The weight of the module can complicate its handling. The increased weight of the module may cause its own distortion, particularly when heated during sterilization in an autoclave. Assembly—assembly of parts, fitting, and bonding large surfaces may increase the potential for failure; again, this may be amplified by heating.

Process—The flow rates through a large HFM can be very high and occur at high pressures. Considering the large surface area of the potted ends, it can be subjected to significant pressures, potentially causing the potted ends to collapse. Reinforcing the potted ends, as will be described, to minimize the distortive effect of pressure when building large filters, would be very beneficial.

Integrity—The larger the HFM and the more hollow fibers packed into it, the greater the probability that a fiber may be damaged or will be damaged during handling. Loss of integrity even in a single fiber may render the entire HFM useless. A break in a hollow fiber will cause contaminating flow from the retentate stream to enter the filtrate stream. The potential loss of integrity due to such a minor defect is also an important reason discouraging construction of such large filters. Using current methods of construction, a HFM may be fully assembled before it is determined that the HFM lacks integrity, in which case the HFM must be discarded. This, in addition to the other potential hazards during construction of large HFMs by current methods, discourages construction of such filters and results in greatly increased manufacturing cost. The proposed method of the invention would minimize or eliminate many of the potential risks to construction of large HFCMs. As part of the invention, methods of hollow fiber filter assembly are described; the assembly of which is not limited to the particular HFCM exemplified.

Sanitary Construction—As many large HFCMs may be used in the food or medical industries, an HFCM needs to comply with the requirements of these industries. Sanitary design may be one of those requirements. There should be no crevices, dead zones, or other factors in the design that trap contaminants, affect clean-ability of the module or affect sterilization of the module. For example, the use of threading would not be desirable. Threading has been shown to be very unsanitary in critical applications requiring sanitary design. Another unsanitary design feature is the presence of dead zones that are inaccessible by normal means; such stagnant zones within the HFCM, or that are associated with the HFCM, entrap contaminants and inhibit their removal. The results are decreased clean-ability, decreased ability to maintain sterility, and increased process contamination. This invention minimizes unsanitary factors and maximizes full and homogeneous penetration into all parts of the HFCM.

BRIEF DESCRIPTION OF THE DRAWINGS

FIG. 1C Side and perspective views of a hexagonal cluster.

FIG. 2C Top view of shell end cap with round receptacles (openings).

FIG. 3B Schematic side view of rollers used by the mechanized system for formation of unit clusters.

FIG. 4C Detailed view of a portion of FIG. 4B.

FIG. 4D Top view of template.

FIG. 5E Top view of shell end cap with hexagonal receptacles (openings).

FIG. 5F Perspective views of hexagonal cluster and hexagonal cluster enclosed in a supportive column, and perspective view of cartridge with a portion removed for illustrative purposes so that the interior structure can be seen.

BRIEF SUMMARY OF THE INVENTION

Figure 1A:
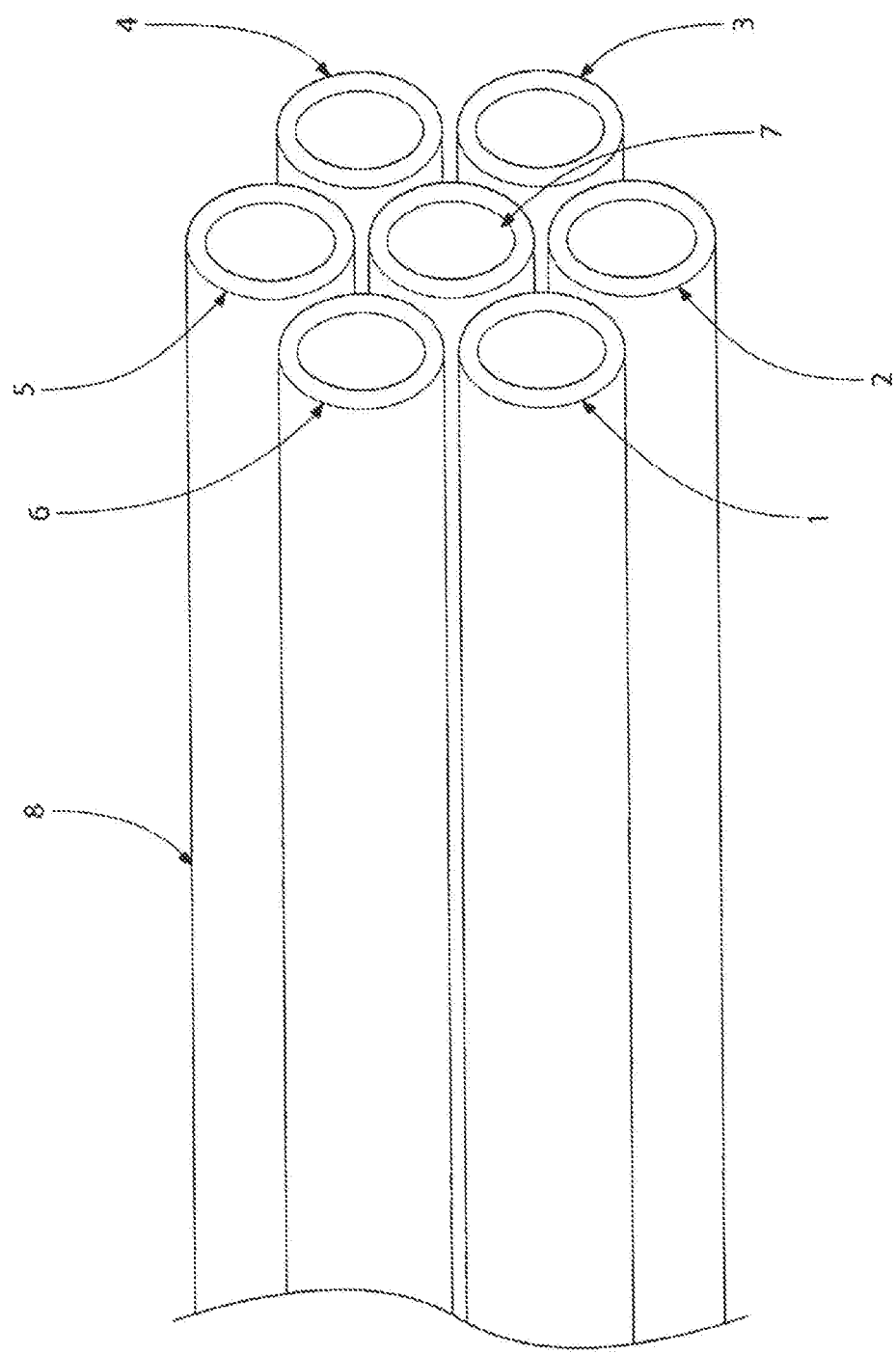
FIG. 1A Partial perspective view of hexagonal cluster of seven hollow fibers.

The invention relates to hollow fiber cartridges whose structure allows the heat induced stresses that occur during the cartridges' uses to be minimized. The reduction of heat-induced stresses is achieved by the use of materials of similar identical coefficients of expansion especially with regards to the outer shell of the cartridge and the shell end caps. The cartridges are further optimized because their fibers are organized into clusters, so that detection and correction of defects in a single hollow fiber can be more readily detected and removed. Clusters can be easily combined to form large entities. The cartridges are further optimized by virtue of having a very high fiber packing density. Such high density is achieved by the cross sectional shape of the clusters, whose shape (e.g. hexagonal) allows close packing of the clusters, one against the other.

Unless otherwise explicitly stated, reference to "hollow fibers" in this patent application is intended to refer to hollow fiber filters; i.e. hollow fibers with pores in their outer wall. The size of the pores will depend on the intended use of the hollow fiber filters.

In a first general aspect the invention is a hollow fiber filter cartridge comprising:
1) a plurality of hollow fiber clusters, each cluster comprising a plurality of hollow fibers parallel to each other, each cluster comprising a first cluster end and a second cluster end,
2) a housing shell, said shell comprising a first end and a second end, each end comprising an opening,
3) a first shell end cap, said cap covering the opening in the first end of the housing shell, said cap comprising a plurality of openings, and
4) a second shell end cap, said cap covering the opening in the second end of the housing shell, said cap comprising a plurality of openings,
wherein the clusters are aligned in parallel within the housing shell, wherein a segment of each cluster is fitted into an opening in the first shell end cap and is sealed against said opening by means of a potting agent (or fixative),
wherein a second segment of each cluster is fitted into an opening in the second shell end cap and is sealed against said opening by means of a potting agent (or fixative); and
wherein each shell end is composed of a material whose thermal coefficient of expansion is sufficiently close to the coefficient of expansion of potting agent such that, when the cartridge is exposed to steam sterilization or autoclaving, no cracks or openings will occur either (a) in the shell end cap or area occupied by the potting agent or (b) between a cap and the area occupied by potting agent.

In particular embodiments of the first general aspect, the inventions are:
a cartridge where the shell and shell end caps are composed of the same material;
a cartridge wherein the housing shell is preferably cylindrical;
a cartridge wherein the housing shell is square or any other shape;
a cartridge wherein the housing shell is permeable or semi-permeable;
a cartridge wherein the shape of each shell end cap opening is selected from the group consisting of hexagonal, square, rectangular, triangular, polygonal, circular and oval;
a cartridge wherein the shape of the shell end cap opening is hexagonal;
a cartridge wherein the first and second end caps are mechanically attached to the housing shell;

a cartridge wherein the first and second end caps are attached to the housing shell by a solvent or an adhesive;

a cartridge wherein said cartridge comprises a supporting element, said supporting element selected from the group consisting of a post and a supportive column, said supportive column shaped to enclose a cluster within said cartridge, said supportive column permeable to fluid emanating from said cartridge;

a cartridge wherein the cross-sectional shape (e.g., hexagonal) of a hollow fiber cluster is the same as the cross-sectional shape (e.g., hexagonal) of the end cap opening into which it is inserted;

a cartridge wherein the distance between the perimeter of one cluster and the perimeter of a neighboring cluster is between 1 millimeter and 5 millimeters, where said distance is the shortest distance between the perimeters of the two clusters; and/or a cartridge wherein the autoclaving is performed under the following conditions: a temperature of 123 degrees Centigrade, a pressure of 16 psi for 45 minutes or the steam sterilization is performed at 123 C, 20 psi, for 20 minutes.

In a second general aspect the invention is a method for assembling a hollow fiber filter cartridge, said method comprising the steps of:
1) pre-machining (or molding) a first shell end cap and a second shell end cap of the cartridge,
2) attaching a shell housing of the cartridge to the first shell end cap;
3) attaching the shell housing of the cartridge to the second shell end cap; 4) inserting each of a plurality of clusters of hollow fibers, through one of a plurality of openings in the first shell end cap, through the shell housing and out the corresponding opening in the second shell end cap, the length of each cluster being the same as or greater than the length of the housing, and
5) potting or bonding a segment of each cluster to the wall of the opening which it was inserted in the first shell end cap and to the wall of the opening which it was inserted in the second end cap;

wherein each shell end is composed of a material whose thermal coefficient of expansion is sufficiently close to the coefficient of expansion of potting agent such that, when the cartridge is exposed to steam sterilization or autoclaving, no cracks or openings will occur either (a) in the shell end cap or area occupied by the potting agent or (b) between a cap and the area occupied by potting agent.

In particular embodiments of the second general aspect, the inventions are:
 a method wherein once the clusters have been potted within the openings, the excess length of the hollow fibers that extends beyond the shell end caps, if any, is cut away;
 a method wherein supportive posts or columns are inserted between end caps within the hollow fiber module;
 a method wherein the supportive columns are disposed between clusters;
 a method wherein clusters are enclosed within the supportive columns, where the supportive are permeable to the flow of filtrate emanating from the clusters within; and/or
 a method wherein the autoclaving is performed under the following conditions: a temperature of 123 degrees Centigrade, at a pressure of 16 psi for 45 minutes or the steam sterilization is performed at 123 C, 20 psi, for 20 minutes.

In a third general aspect the invention is a system for assembling a plurality of hollow fibers into a fixed cluster, said system comprising:
1) a fiber source, said source a source of a plurality of hollow fibers;
2) a perforated template for directing and organizing the plurality of hollow fibers;
3) a fixing chamber comprising a nozzle or multiple nozzles for spraying or addition of potting agent or fixative on a cluster of fibers that have passed through a template;
4) a shaping template or method for shaping the potting agent around the hollow fibers into a desired shape, such as a hexagon;
5) a cutting device for cutting the fiber bundle at a position about the midpoint along the potted or fixed region;
6) a device or mechanism for capturing or removing the lead cluster from the fixing chamber;
7) a collet device for attaching to the trailing cut cluster and advancing it away from the fixing chamber a specific distance; a driving/retraction device that moves along an automated belt and pulley system for advancing or retracting the said collet;
8) repeating steps 2-7;
wherein the elements of the system are arranged such that fibers can be pulled from the fiber source, through the template perforations, then through the fixing chamber where they are sprayed (coated or embedded) with a potting agent, and cut to a desired length.

In particular embodiments of the third general aspect, the inventions are:
 a system wherein the fiber source comprises spools around which hollow fiber (tubes) can be wound; and/or
 a system wherein the fiber source comprises an extruding device which extrudes a plurality of hollow fibers.

In a fourth general aspect the invention is a method for assembling a plurality of hollow fiber filters into a cluster, said method utilizing the system of the third general aspect, said method comprising the steps of: pulling the HFs from a fiber source, through the template perforations (openings), then through the fixing chamber where they are sprayed (coated or embedded) with a potting agent, and cut to a desired length.

In particular embodiments of the fourth general aspect, the inventions are:
 a method wherein said template perforations are arranged in a hexagonal pattern;
 a method wherein the plurality of hollow fiber strands is directed towards the template using sets of rollers;
 a method wherein there are hemicircular grooves in the outer faces of the rollers, and wherein said rollers are paired to one another in an adjacent and parallel fashion, such that the hollow fibers are directed between the roller pairs and are slidably received over the grooves,
 a method wherein the clusters are fixed in an arrangement using prefabricated segments;
 a method wherein the cluster of fibers are rotated subsequent to being sprayed with fixative in a first spraying step, said rotation less than a full 360 degree rotation, and subsequent to said rotation said cluster is sprayed again in a second spraying step; and/or a method wherein one or more spray nozzles are rotated subsequent to being used to spray a cluster with fixative in a first spraying step, said rotation around the main axis of the cluster, said less than a full 360 degree rotation, and subsequent to said rotation said cluster is sprayed again in a second spraying step.

In a fifth general aspect the invention is a method of constructing a cluster with prefabricated end caps which comprises folding a cluster linear segment to form a cluster hexagonal segment.

In a sixth general aspect the invention is a cluster of hollow fibers, said cluster comprising a plurality of hollow fibers, wherein a segment of each hollow fiber is fixed to adjacent parallel fibers within the same region at or near the ends of each cluster.

In particular embodiments of the sixth general aspect, the inventions are:

a cluster wherein each hollow fiber of the cluster is fixed to adjacent parallel fibers using a liquid fixative;

a cluster wherein each hollow fiber of the cluster is secured to adjacent parallel fibers using an end cap or prefabricated segment;

a cluster wherein there are 7 fibers in a cluster; and/or a cluster wherein said cluster is partially or fully enclosed in a sleeve that is permeable to the flow of fluid (such as filtrate).

In a seventh general aspect the invention is a cluster aggregate, said cluster aggregate being an aggregate of a plurality of clusters, such that each cluster in the aggregate is parallel to all other clusters in the aggregate.

In an eighth general aspect the invention is a method of creating a cluster aggregate wherein a plurality (more than one) of clusters are combined to form a cluster aggregate, such that each cluster in the aggregate is parallel to all other clusters in the aggregate.

In particular embodiments of the eighth general aspect, the inventions are:

a method comprising the step of combining a plurality of individual dusters (u-clusters) into a cluster aggregate; and/or a method comprising the step of combining a plurality of cluster aggregates into a single cluster aggregate.

In an ninth general aspect the invention is a method of testing the integrity of a cluster or cluster aggregate, said method comprising the step of subjecting said cluster or cluster aggregate to an integrity test.

In particular embodiments of the ninth general aspect, the inventions are:

a method wherein the testing is done before the cluster or cluster aggregate is inserted into the end cap of a cartridge;

a method wherein a cluster aggregate is subjected to the integrity test; and/or a method wherein the integrity test is selected from the group consisting of a bubble point test, a pressure drop test, exposure to vapor comprising particulates and a diffusion test.

In a tenth general aspect the invention is a method of pretreating a cluster said method comprising the step of subjecting the cluster to conditions that will shrink the cluster and/or relieve stresses in the cluster's potted area, wherein the cluster is subjected to said conditions before the cluster is inserted into a shell end cap.

In an eleventh general aspect, the invention is a rectangular module, said module comprising:

a cluster, said cluster comprising a first cluster end and a second cluster end (co-located with the shell ends), said cluster comprising hollow fibers, said hollow fibers being hollow fiber filters with pores in their walls, such that fluid (retentate) can pass through the inside of the fibers while a portion of that retentate escapes through the pores to become filtrate, a cartridge shell, said shell encasing the cluster but not sealing off the ends of the hollow fibers, said shell comprising openings to allow escape of filtrate through the cartridge shell, said shell contacting (directly or via an intermediate gasket or sealant) the cluster in a leak proof manner so as to prevent filtrate from mixing with retentate, a housing enclosing said cartridge but not sealing off the ends of the hollow fibers, a first channel within said housing, said channel comprising an opening for receiving fluid (retentate) from outside the housing, said channel interfacing with a first end of the cluster so that said received retentate fluid can move from the channel into and then through the hollow fibers of the cluster, provided that some of the retentate fluid escapes through the filter pores as filtrate, a second channel within said housing, said second channel interfacing with the second end of the cluster so that received retentate fluid that has passed through the hollow fibers will enter the second channel, said channel comprising an opening for permitting the escape of retentate fluid from the second channel and the housing, where the first and second channels open on opposite sides of the housing, said housing further comprising one or more ports, so as to allow filtrate to escape the housing or to receive filtrate, from the port or ports of an adjacent housing should there be an adjacent housing.

Here, modules, clusters, housing, and cartridge shells are rectangular if they have a rectangular shape and as seen from a top view and have a rectangular shape as seen from an end view. It is understood that a square is also a rectangle.

It is preferred that the cluster and cartridge are also rectangular.

It is understood that instead of a cluster the aforementioned eleventh general aspect applies equally well to an aggregate of clusters.

It is understood that the distinction between retentate fluid and filtrate, and the role of the filter pores applies equally well to all inventions disclosed in this application.

A related invention is an assembly of two or more rectangular modules, where the modules are aligned so that the channels of adjacent modules are in open contact with each other and the ports of adjacent modules are in open contact with each other.

A hexagonal cluster is one in which, as seen in cross section, the center of the fibers on the outer perimeter of the cluster can be connected by straight lines that form a hexagon.

In another aspect, the invention is a method for assembly of shell end caps and housing (e.g. tongue and groove) to form a frame for receiving clusters.

In another aspect, the invention is a method for introducing a twist in the clusters of hollow fibers to disrupt linear flow through the fibers.

In another aspect, the invention is a method of constructing a hollow fiber cartridge wherein clusters of fibers with a convenient cross sectional shape (e.g. hexagonal) are fitted through identically shaped openings of the cartridge and portions of the clusters that extend outside the cartridge are sliced off.

In still another aspect, the invention is a method of constructing a hollow fiber cluster wherein each fiber originates on a spool and the fibers pass through a template whose openings are arranged in the manner desired for the cross sectional organization of the cluster. Alternatively, the fibers can originate from an extrusion head equipped with extrusion nozzles arranged in the configuration desired for the cross sectional organization.

In still another aspect, the invention is a method of constructing a hollow fiber cluster wherein a foldable linear segment is folded into a desired shape (for example into a hexagonal configuration).

DETAILED DESCRIPTION OF THE INVENTION

Figure 2A:
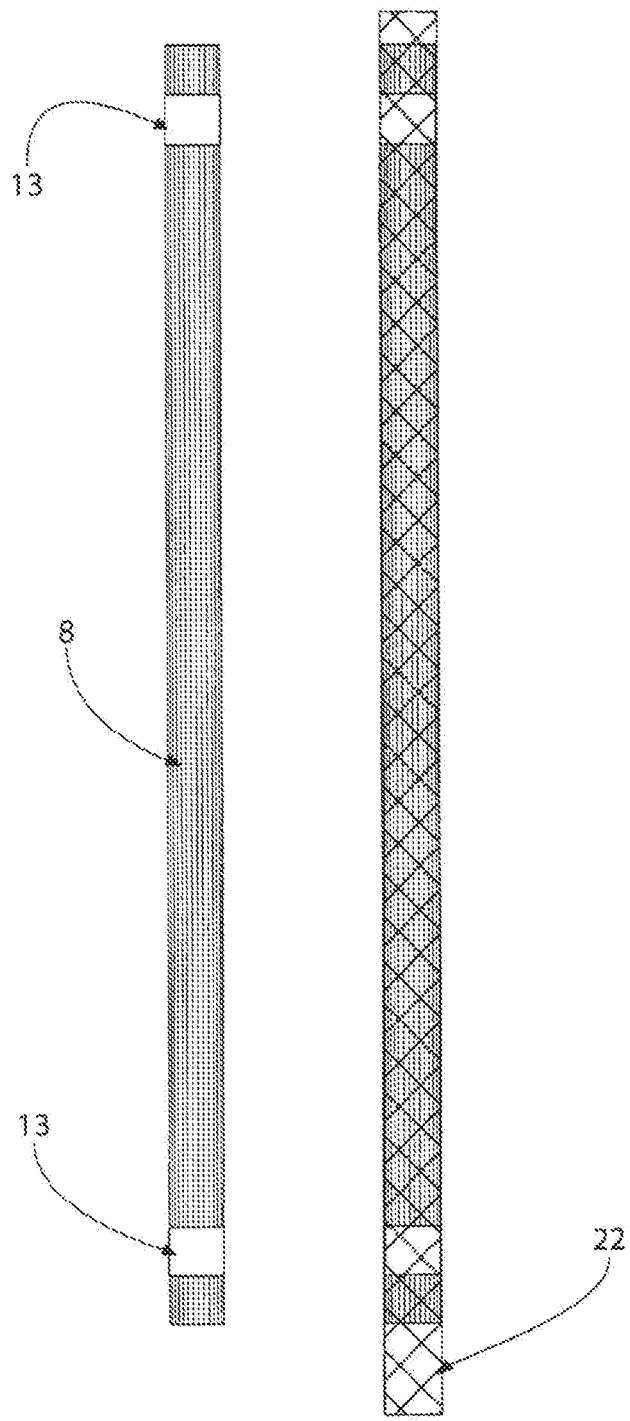
FIG. 2A Side view of round bundles of fibers with and without a net sleeve.

I. Method for Minimizing the Use of Potting Material:

One method by which the described undesirable effects of potting can be eliminated is to minimize or eliminate the use of potting material. By eliminating or minimizing the use of a potting material that is different from the material of which the shell is made, one can greatly diminish the undesirable effects of using incompatible materials. In the present invention, the potting process is largely eliminated by pre-machining or molding the "shell end caps" 11 and 12, FIGS. 2B, 2C, 2D, and FIGS. 5B, 5C, 5D, 5E of the HFC, such that the material and or properties of the machined or molded shell end cap 11 and 12 are identical or very similar to the material of which the shell housing 10 is made. Such shell end caps provide a mechanism for attachment or bonding to the respective ends of the shell of the HFC. One such attachment mechanism involves forming a circular groove 16 in the face of the shell end cap 11 or 12, such that the dimensions and size of the groove can accept insertion of the end of the shell, in a "tongue and groove" like arrangement. (See FIGS. 2E and 2F). Following insertion of the shell end 14 into the shell end cap groove 16, the two may be bonded with adhesive, heat, or mechanically locked. Shell end caps 11 and 12 may be similarly attached to the respective shell ends 15 and 14. Additionally, each shell end cap is provided with openings or receptacles 17, such that corresponding openings, on each shell end cap, align linearly and juxtaposed along an axis between them and where the axis between any two sets of openings 17 is parallel to every other axis between a set of openings 17.

Figure 2B:
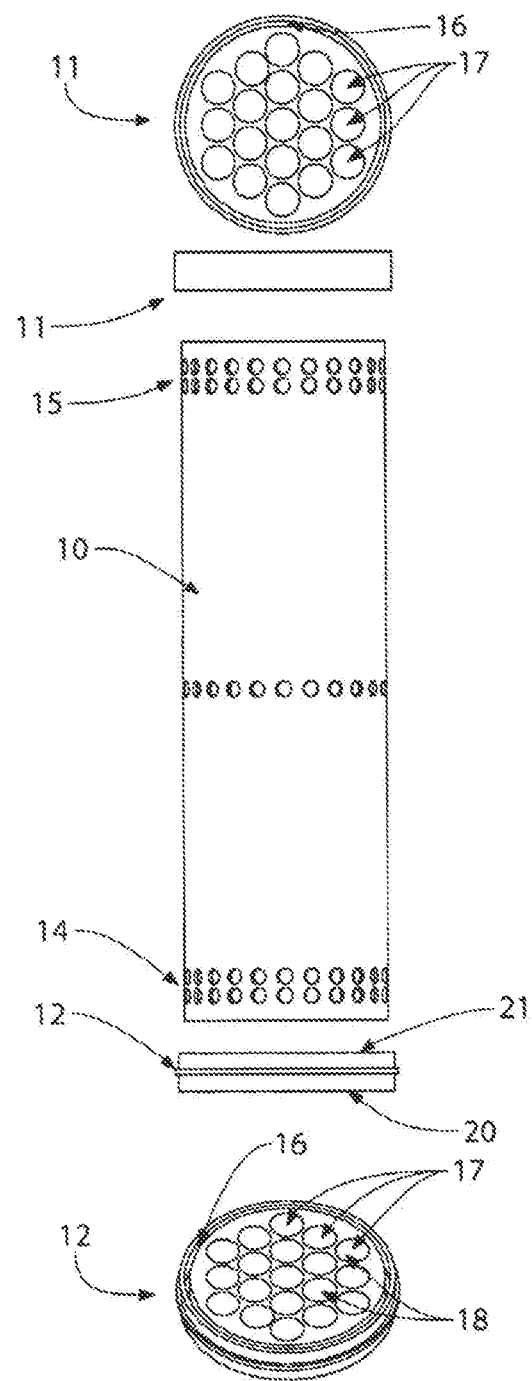
FIG. 2B Various views of the HFC housing assembly using shell end caps with round receptacles (openings).
Figure 2C:
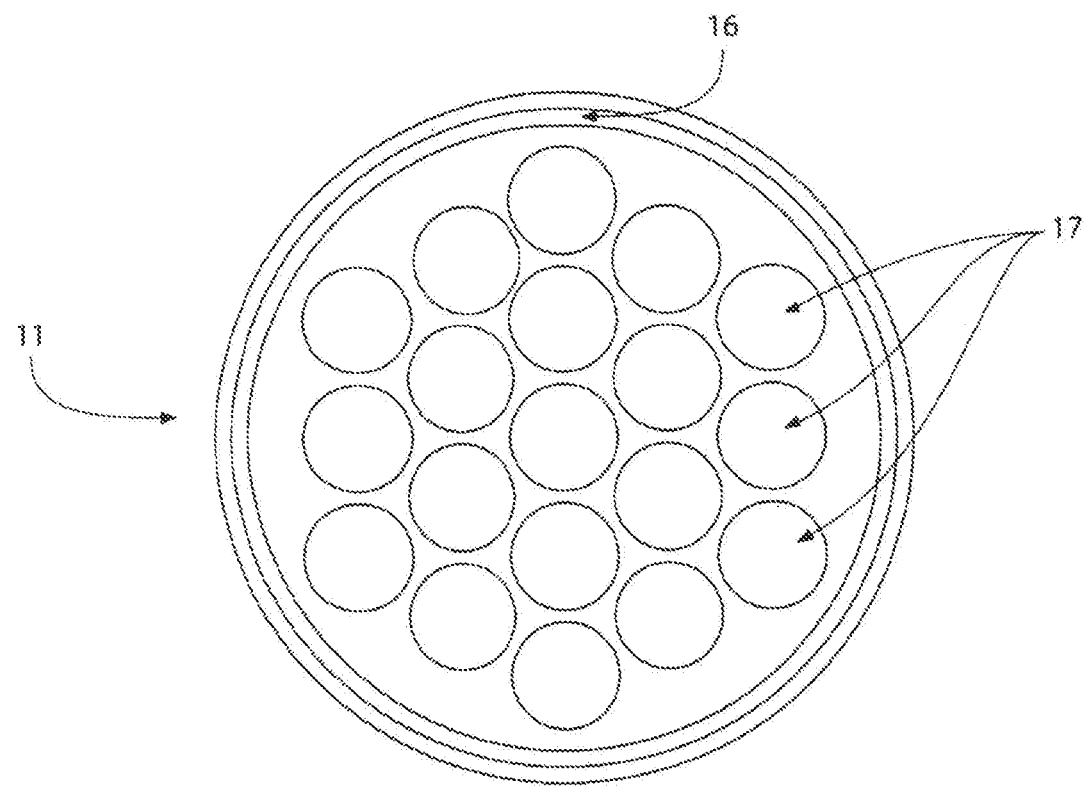
Figure 2D:
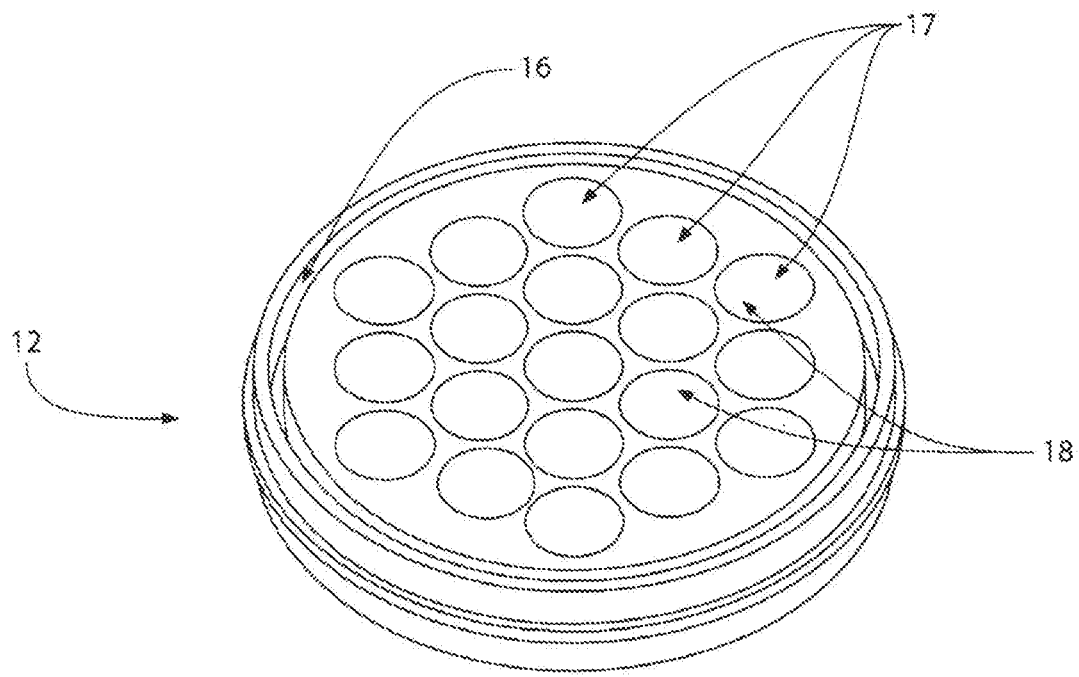
FIG. 2D Perspective view of shell end cap with round receptacles (openings).
Figures 2E, 2F:
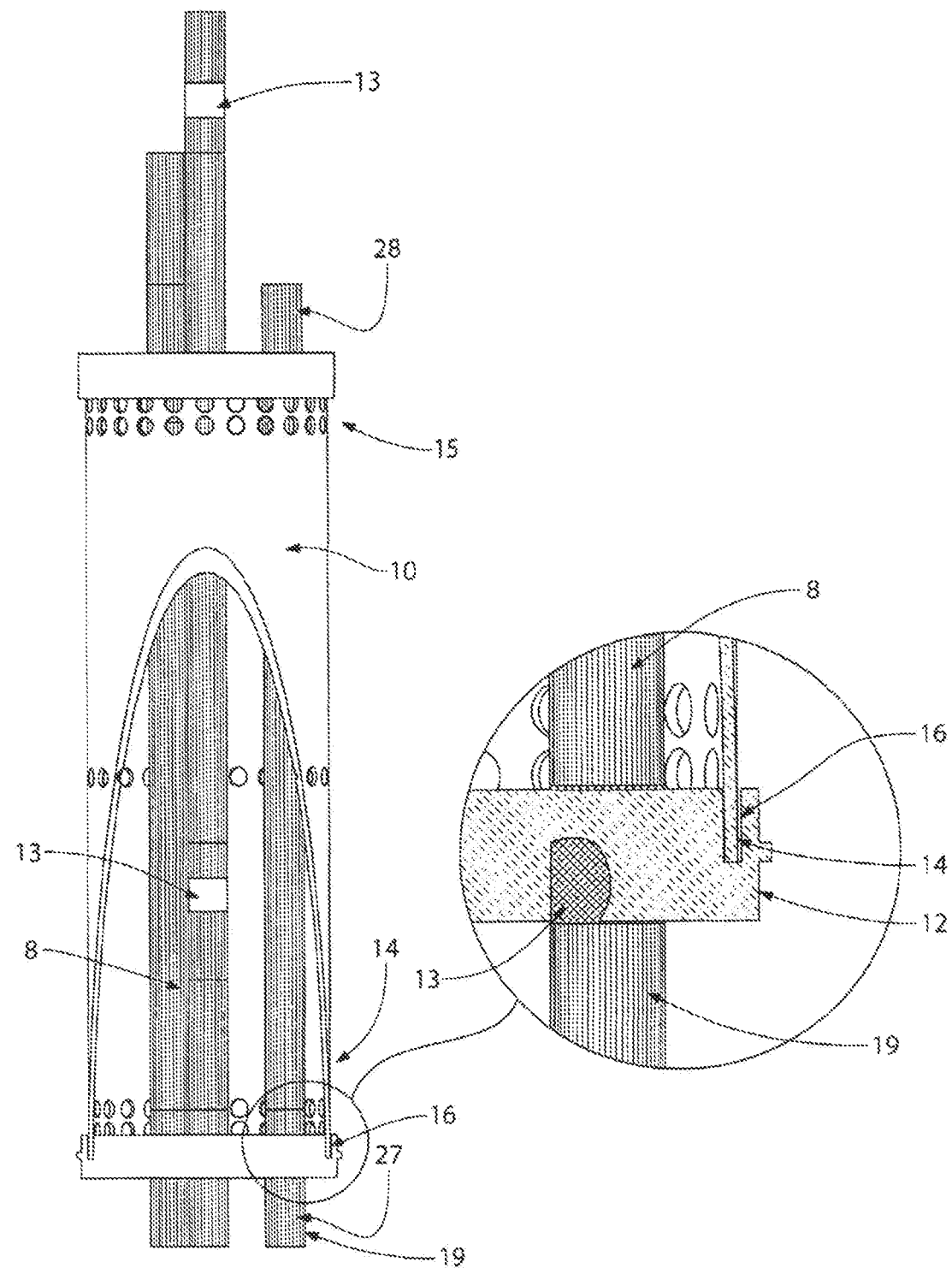
FIG. 2E Side view of HFC with portion of the exterior removed for purposes of the drawing.
FIG. 2F Enlarged view in cross section of a portion of the drawing of FIG. 2E.
Figure 2G:
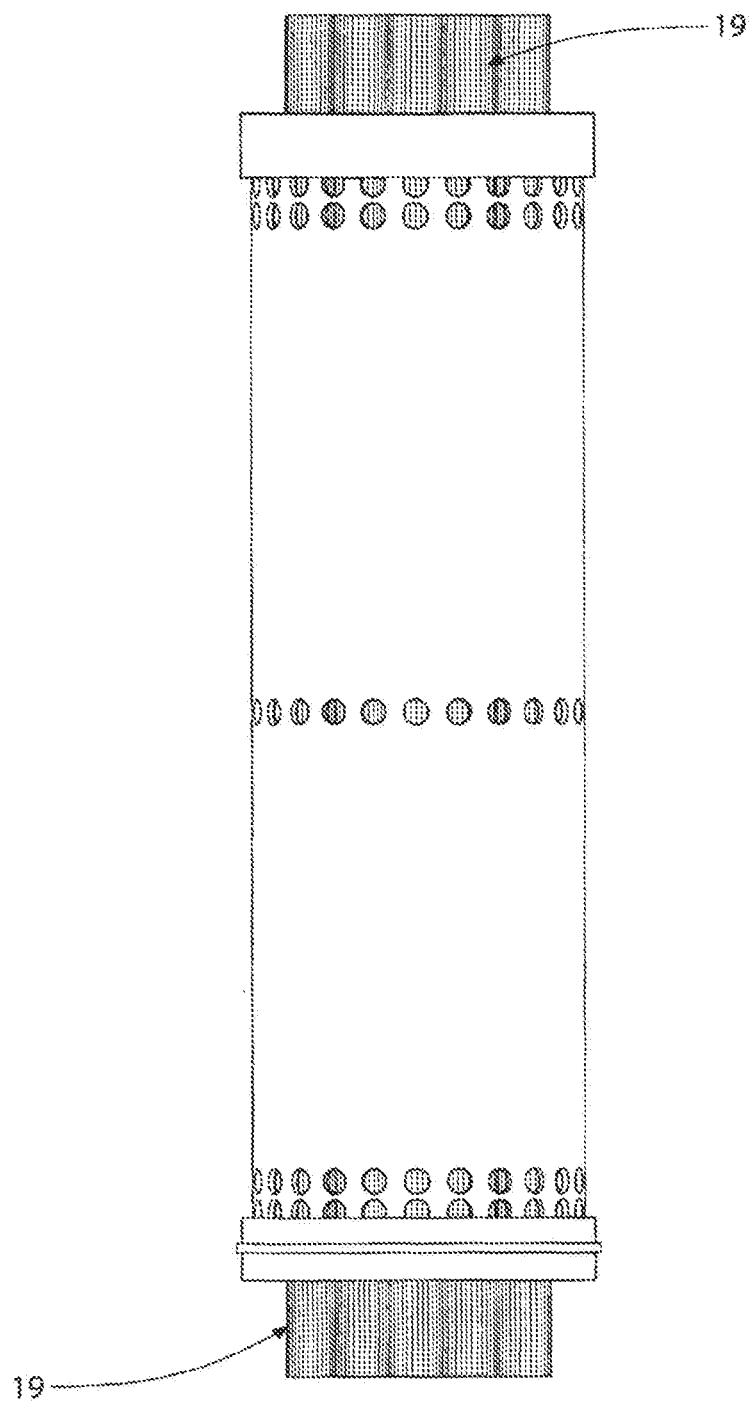
FIG. 2G Side view of HFC using shell end caps with round receptacles (openings) and round bundles.
Figure 5A:
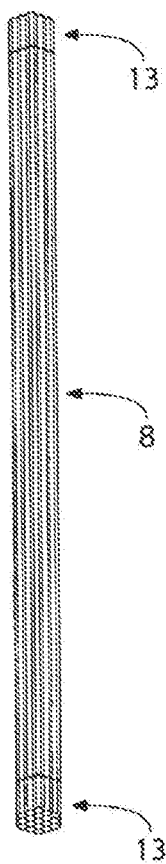
FIG. 5A Perspective view of hexagonal cluster.
Figure 5B:
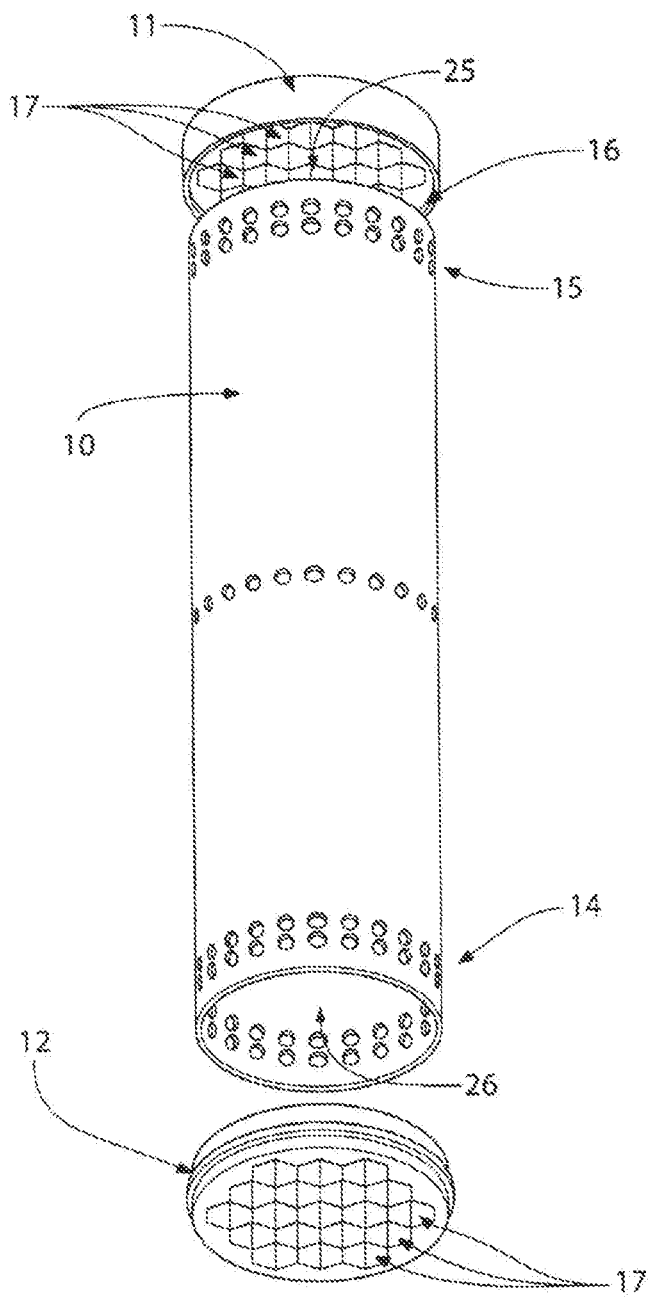
FIG. 5B Exploded perspective view of HFC housing using shell end caps with hexagonal receptacles (openings).
Figure 5C:
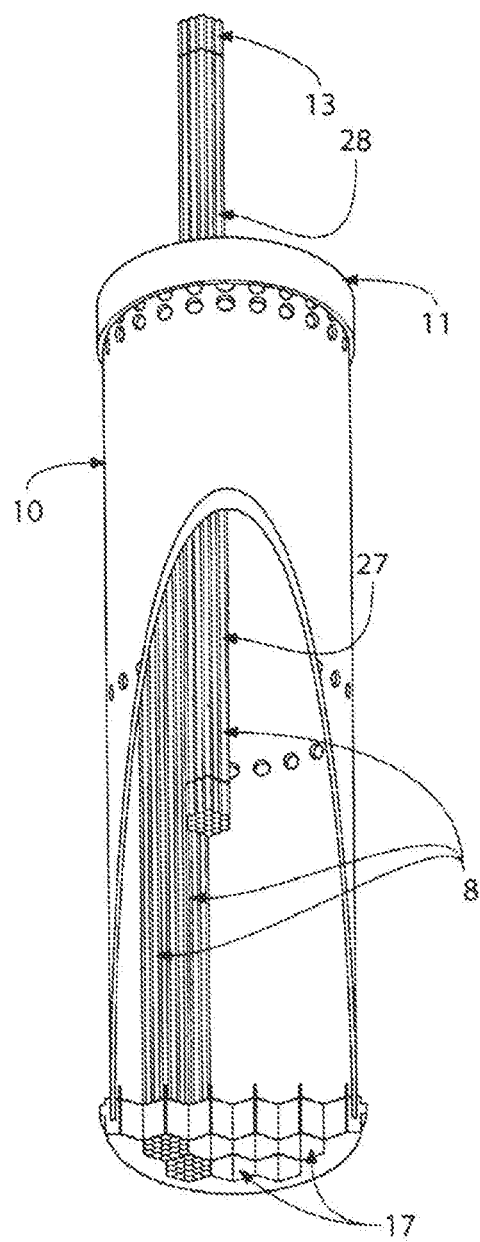
FIG. 5C Perspective view of partially assembled HFC using shell end caps with hexagonal receptacles (openings) and hexagonal clusters, with a portion of the outer wall cut-away for purposes of the drawing.
Figure 5D:
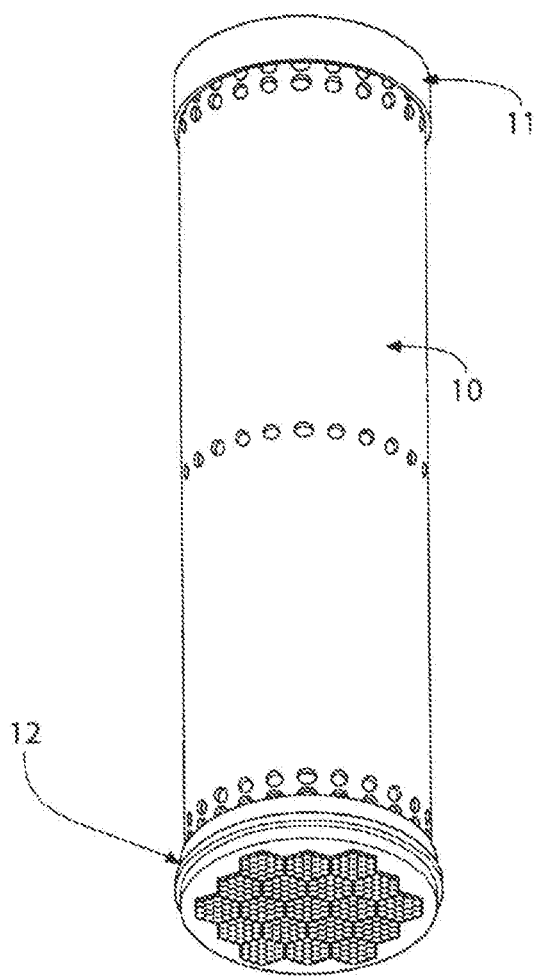
FIG. 5D Perspective view of HFC using hexagonal receptacles (openings) and hexagonal clusters.
Figure 5E:
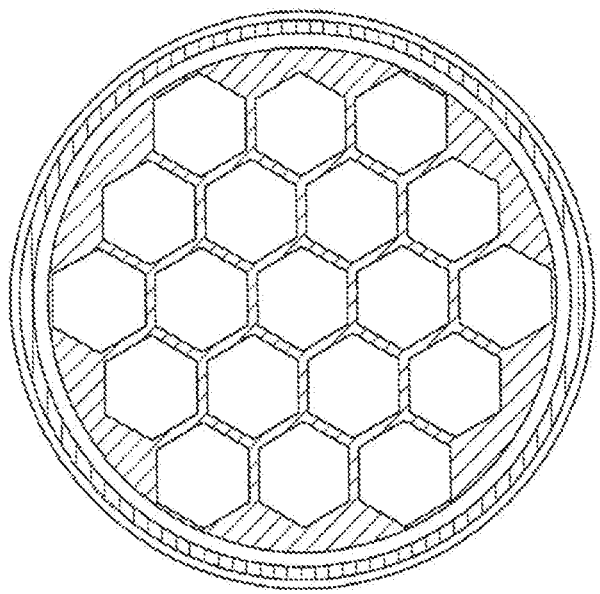

A "fixed" bundle or "fixed" cluster of HFs 8 (see for example, FIGS. 1C, 2A, and 5A), whose length is typically greater than the length of the housing (the housing consists of the shell with attached shell end caps, (HFC-H)), may be inserted through the opening 17 at end 15 and guided through the shell end caps 11, through the shell 10 and out the corresponding opening 17 in the shell end cap 12 at the other end 14 of the HFC-H assembly. The insertion is mostly manual but may be assisted by a pulling device, a rod like arm that extends through the housing and both shell end caps 11 and 12. At the insertion end of the arm, there may be a "grabbing" mechanism that may grab the insertion end of the cluster. The arm may than be retracted pulling the cluster first end 27 through the first shell end cap opening 17 through the length of the housing shell and through the second shell end cap opening 17. The cluster is pulled through the housing and end caps to the extent that cluster ends 19 are protruding from either end. The process of inserting clusters may be repeated until all clusters have been inserted into the housing and shell end caps 11 and 12. The bundles being longer then the shell with shell end caps, portions 19 of the bundles will extend somewhat beyond the shell end caps 11 and 12 (FIG. 2G). The HF bundle potted or un-potted ends positioned within the shell end cap opening 17 can then be fully potted in a manner that the potting material will flow in the space between the fibers so they are potted together and at the same time bond to the walls 18 of the opening 17; with slightly extended HFs from the face of the shell end cap, the potting agent can be added to the opening 17 (FIG. 2B, FIG. 5C). The hollow fiber ends may be plugged or unplugged, assuring no potting agent gets into the fibers during its addition to opening 17.

One may use common techniques to achieve the indicated potting process. The following are some examples: One, the bundle of HFs may be enclosed in a sleeve 22, such as a net sleeve, that is permeable to the flow of filtrate yet capable of providing structural support to the bundle so that its shape is maintained (FIG. 2A). The sleeve can also facilitate the insertion of the bundle through the HFC-H, from opening 17 on one end of the HFM-C through to the other shell end cap opening 17; a device may be inserted through opening 17 at one shell end cap 11 either partially into the housing 10 or all the way through to the other end of the HFC-H, through the corresponding (linearly aligned) openings 17 in shell end cap 12; the device may then grab the proximal end of the sleeve 22, with enclosed HFs; the sleeve and the bundle within it can then be pulled by the device through the corresponding openings 17. The HFs within the bundle 8 may have either plugged ends or open ends. Two, the bundle may be pre-potted (or "fixed") or not, "fixed" meaning that the fibers are bonded to each other in a desired arrangement with a small amount of fixative or potting agent, and where only a small "segment" 13 defined by the fiber to fiber bonded region (also referred to as bundle "fixed ends". "potted ends". "potted area", or "potted region") at each end of the bundle is potted.

The fixed segment 13 and the openings in the shell end cap 11 may be of any shape or configuration and may be spaced relative to each other as needed (1) to generate desired shapes and arrangement of bundles or (2) to secure the bundles at each end within the corresponding openings or (3) to mechanically secure the bundles within the holes and to assure the assembly is leak proof. Addition of a small amount of potting agent into the opening 17 in the shell end caps can be used to direct the potting agent flow between the fibers and between the bundle outer wall and the inner wall 18 of the opening 17; the fixative serves as a filler and adhesive to pot the fibers within the openings and to secure the opening against leakage. A fixture may be added to the end of the shell end cap to facilitate the addition of the fixative, to confine it, direct it and to prevent its leakage. The fixative or potting agent may be added to the openings that contain HF bundles within, either from the external face 20 of the shell end cap or through the internal face 21 on the inside of the HFM housing. Once the HFs or bundles have been potted within the openings, the excess length 19 of the HFs may be cut away exposing the open ends of the HFs at each end of the HFC, thereby forming a continuous, uninterrupted conduit (See FIG. 5D, for example).

Figure 5F:
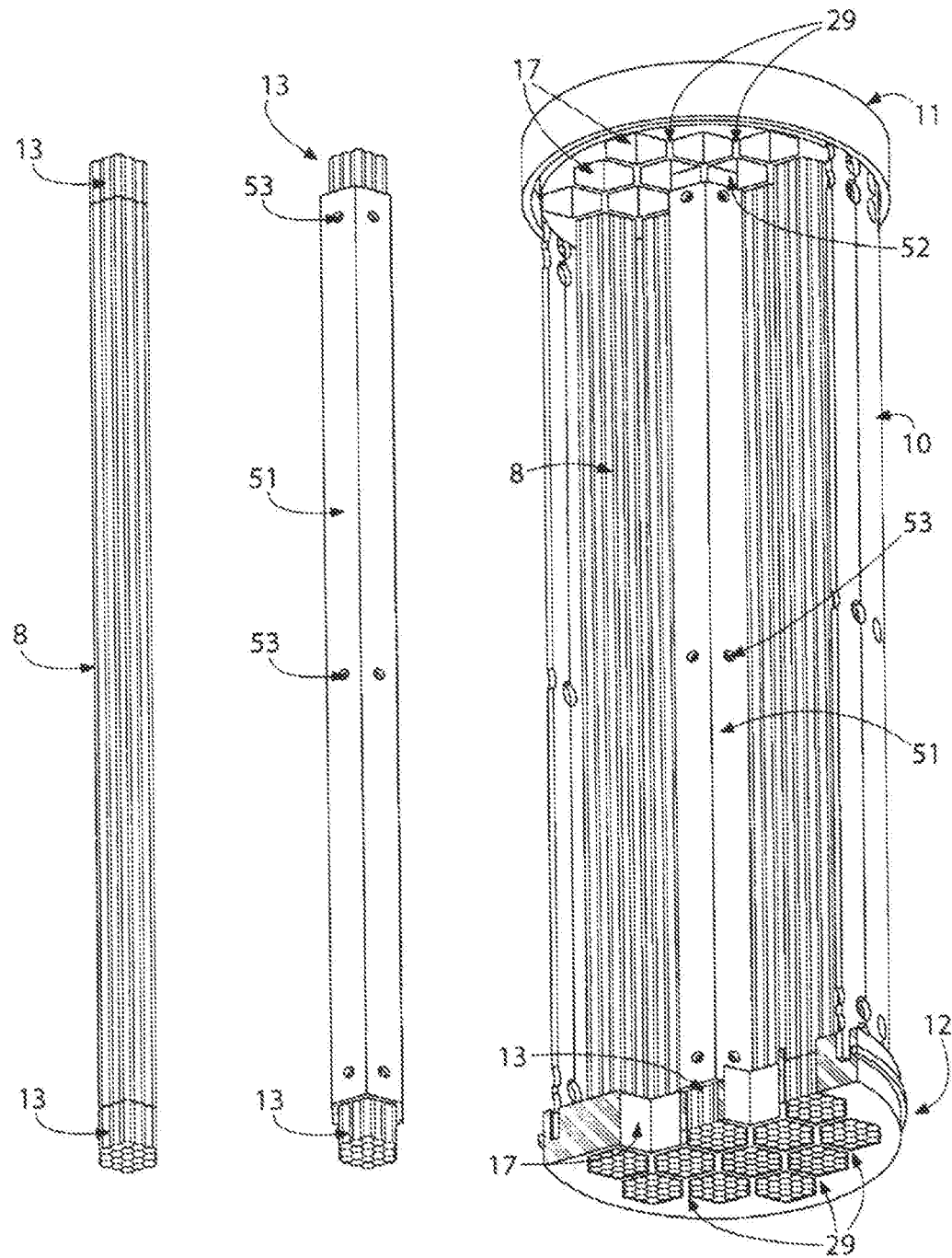

The described method of construction eliminates the need for use of large volumes of potting agent as a means of forming end caps and for embedding the HFs. A significantly smaller amount of potting material is needed; and the potting material is localized to the openings within the shell end caps, excluded from the HFs. Each opening and bundle set may be viewed as an independent HF cartridge; where its smaller diameter negates the problems of a single pot of a large HFC. One can envision extending the use of the described method to formation of HFCMs of any size or diameter. See FIG. 5F; insertion of supportive posts or column(s) 51 between shell end caps 11 and 12, within the HFM-H may be used to add structural strength to the assembly. In the example shown in FIG. 5F, those supportive columns 51 may consist of a hexagonal tube which may enclose a bundle 8. The supportive column may extend nearly the length of the length of the bundle; preferably, the length of the tube is the length between shell end caps 11 and 12 inside the housing; optionally the length of the tube is somewhat longer, extending into the fixed area 13, on each side of the bundle. Such an additional length at each end of the bundle may be, for example, $1/16$ to $1/4$ of an inch in length. A corresponding length would be removed from the walls 29 of the end caps opening 17 receiving the hexagonal column 51; therefore, the fixed region 13 of the bundle 8 would be inserted in the opening 17, at least, to the external face of the end cap. The hexagonal column end would be inserted into the end cap, to the depth removed 52 from the receiving opening 17 wall 29, thereby, anchoring the hexagonal column 51 in the corresponding end cap 52. The hexagonal column 51 is similarly anchored in the end cap at the other side of the HFM-H. The number and spacing of such hexagonal columns within the HFM-H between the end caps can be readily determined, by someone who is skilled, to achieve the necessary structural support. The hexagonal columns 51 would contain any number of openings 53 in the body of the column for the flow of filtrate from the bundle inside the column to the outside of the column and into the filtrate pool inside the HFM-H.

II. Method for Automating the Construction of Hollow Fiber Subassembly Units:

A construction process of the present invention is described whereby the assembly of a large HFCM with the aforementioned benefits is greatly facilitated. Additionally, the process would provide other apparent benefits and eliminate many problems associated with current or previous construction methods of HFCM. Furthermore, a prime benefit and objective of the proposed construction process is to automate the process. Automation provides the means for increasing construction reliability, manufacturing speed, reduced manufacturing costs, and the ability to form unique filters not readily possible by current methods. These, and other benefits, are described herein.

Cluster Unit Construction—

Figure 1B:
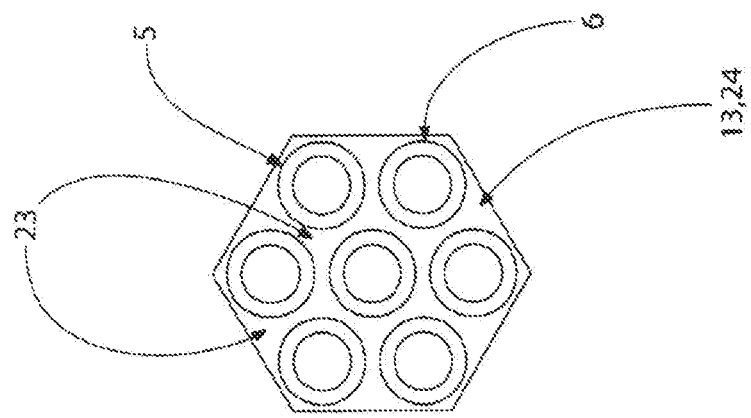
FIG. 1B End view of hexagonal cluster of FIG. 1A and end view of the cluster with fixed ends.
Figure 1B:
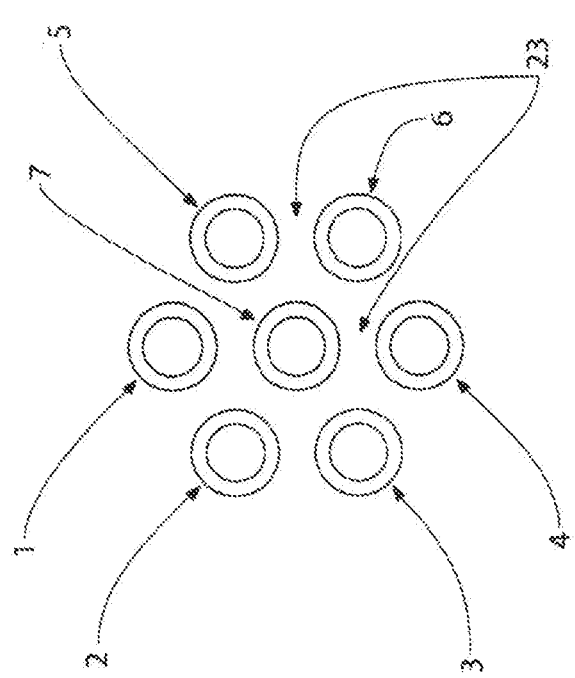

The basis of construction for the HFCM is a modular assembly process. A seven fiber cluster arranged in a hexagon is used to illustrate the basis of this novel construction process. The seven-fiber hexagonal cluster will be referred to as hexagonal cluster, cluster unit or simply cluster. FIGS. 1A, 1B, and 1C show the arrangement of a HF unit cluster ("u-cluster") (FIG. 1A is highly schematic and does not show any "fixed" regions). Such an arrangement is applicable to round hollow fibers of any diameter. One of the HFs 7 is centrally located, and the remaining six HFs 1-6 form a concentric hexagon 8 around the central HF 7. The hexagonal cluster of fibers can be potted with a fixative 24 at both ends or near the ends to retain the hexagonal shape of the cluster as well as the hexagonal shape (cross-section) of the potted segment 13; such a hexagonal cluster offers many advantages as will be described; therefore, the construction of the cluster becomes a critical step.

Figure 3A:
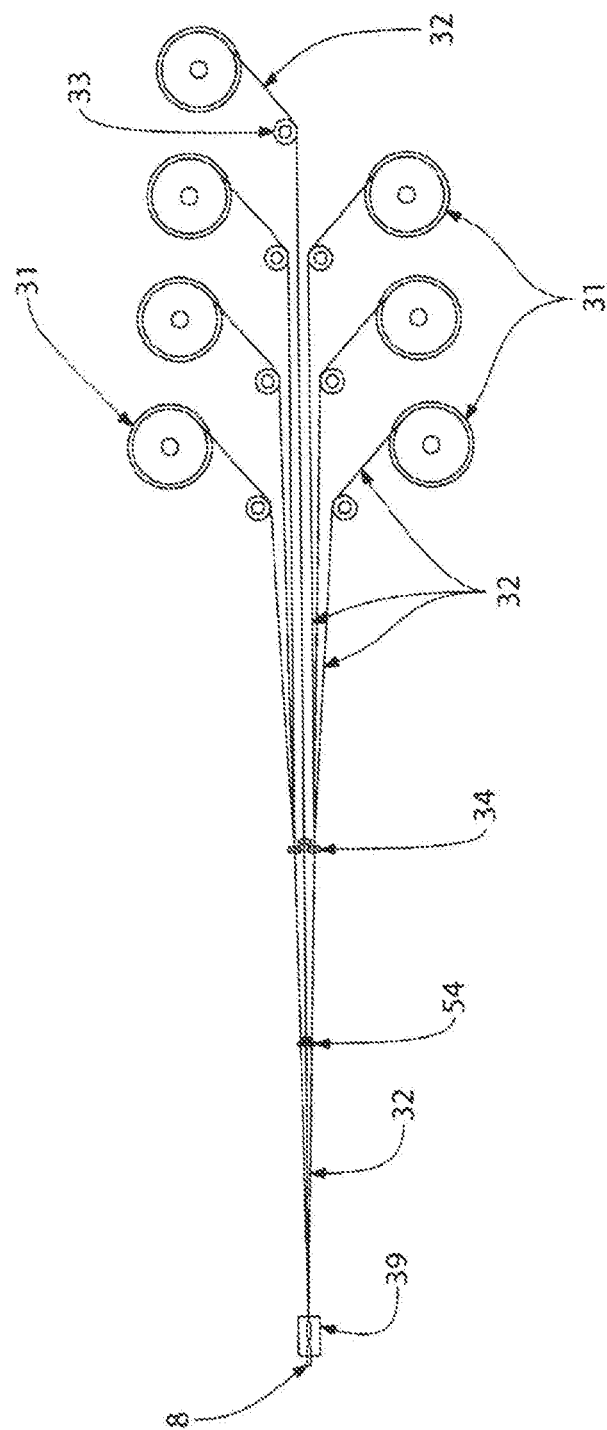
FIG. 3A Schematic view of mechanized system for formation of unit clusters.
Figure 4A:
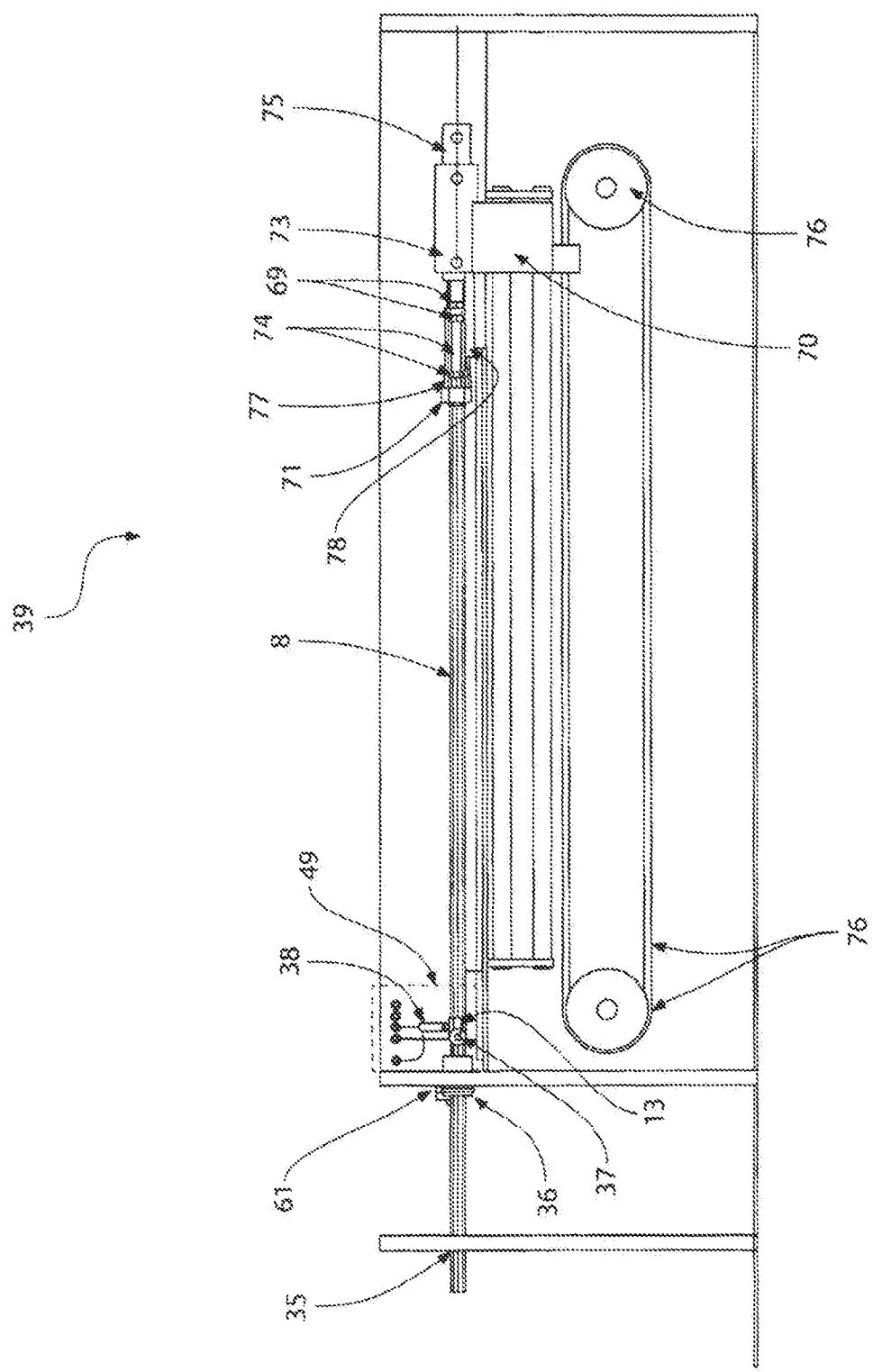
FIG. 4A Side view of fixing center.
Figure 4B:
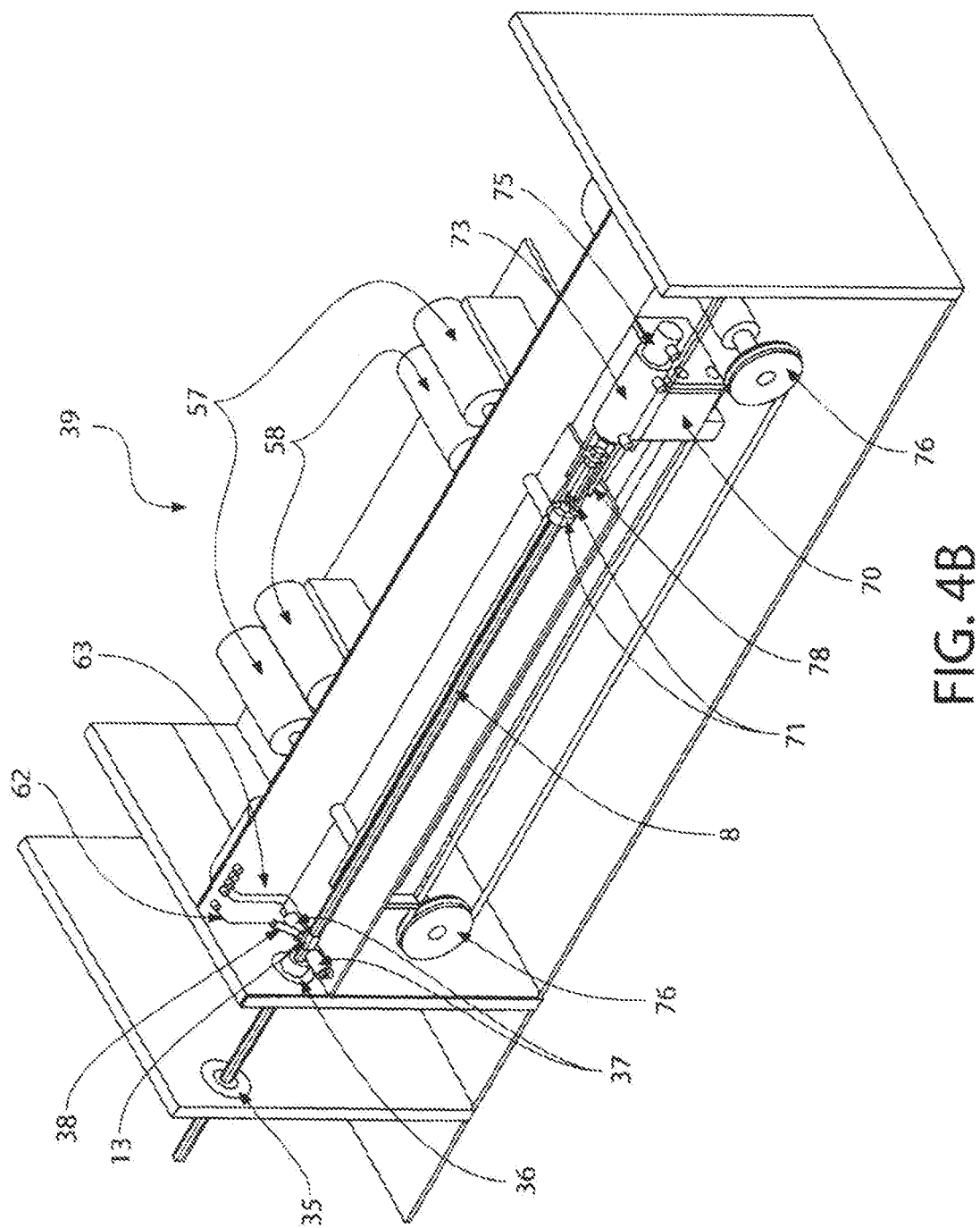
FIG. 4B Perspective view of fixing center.
Figure 4D:
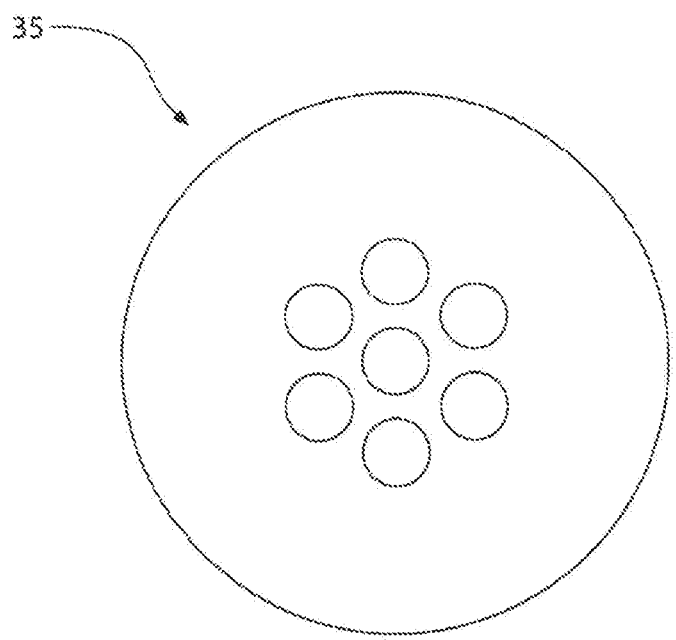

FIG. 3A shows a basic form of an automated system for producing the u-cluster. The hollow fiber feed stock for production of the HF cluster is supplied in spools 31, as is common in the industry. Seven spools provide the starting HF stock material. A HF strand 32 from each spool can be directed by sets of rollers 33 that advance, direct and arrange the hollow fibers so they are positioned in close proximity to each other and are focused into a second set of rollers 34 that further arrange the fiber at their outlets 41 to 47 relative to each to form a "hexagon" (FIG. 3B). The fibers emerging from the set of rollers 34 may be directed to a third set of rollers 54, similar in arrangement to roller set 34 but smaller and designed to focus the fibers further into a tighter hexagon. Emerging from the roller set 54, the fiber set in the form of a hexagon is directed into a template 35 (FIG. 4A, 4D). Other means are possible for advancing and positioning the HFs relative to template 35.

Template 35 contains seven openings, which are also arranged hexagonally, with one opening in the center and six opening concentrically placed around the central opening. The diameter of each opening is preferably slightly larger than the HF outer diameter, allowing the fiber pass freely through the opening without damage, yet controlling excessive "float" of the fiber within the opening. The distance between adjacent openings 23 (FIG. 1B) controls the spacing 23 between adjacent fibers. The HF emerging from the hexagonal template 35 (FIG. 4A) are, therefore, also hexagonal and spaced from each other as set by the template. The HFs for forming the cluster may also be supplied directly from a HF spinning assembly (not shown). The HF spinning assembly may contain a HF extruding head that contains one or multiple extruding nozzles, arranged in desired form (such an arrangement is also referred to as an "extruding device"). One may, therefore, provide seven HF strands for forming the hexagon arrangement directly from the extruding head. The fibers emerging from the extrusion head will be further processed and conditioned by methods similar to those commonly used to generate fibers of the desired consistencies, including the desired physical condition, properties such as porosity, pore size and structural requirements, etc.

Since the HFs are fragile, measures must be taken to minimize or eliminate any potential for fiber damage. Possible points of stress to the fibers include: 1) The unspooling of the fibers which may require that the spool 31 itself be rotated at a specific rate to unwind the fiber, and to eliminate the need for pulling the fiber off of the spool; alternately, low friction bearings on the spool shaft may be used to minimize the pulling force. 2) Similarly, the rollers 33 that direct the HF threads from the spools may be another point of stress. Motor driven rollers synchronized to the unspooling of the fiber may provide a solution; or, the use of very low friction bearings on the roller shafts may also be acceptable. To keep the position of the fibers between the rollers 34 and 54, hemi-circular grooves 55 are formed in the outer face of adjacent roller pairs 120, 121 (FIG. 3B), which when combined form a circular rotating "pass through" 66 for the fibers. The diameter of the hemi circular grooves 55 on each roller 120, 121 being equal or slightly larger than the hollow fibers, yet, not too large to allow excessive float or vibration of the fiber moving through between the rollers. The rollers provide not only a low friction pass through but also position the HF in space. Similar or equivalent considerations must be given to all components directing the HFs to eliminate their damage. Therefore, one must consider all aspects of the process, including, positioning of the HF spools and rollers, the size of rollers, the number of roller sets, orifice sizes, composition of rollers, their finish and shapes for fiber pass-troughs, etc. Similarly the hexagonal templates may be varied to provide optimal flow of HF, to minimize their damage. Sensors may be incorporated at various points to monitor the rate of HF movement, strain on the HFs, vibrations or any other parameter that may affect the integrity of the HFs or the process as a whole.

Positioning for HF Fixing or Fixation—

Once a hexagonal HF arrangement has been formed by the first hexagonal template 35, it is preferable to retain that shape as the fibers are directed towards the "fixing center" 39 and FIG. 4A. The fixing center containing one or more chambers where the HFs are bonded or fixed to each other with a fixative 24 in the form of a desired arrangement, preferably into a hexagonal shape, and where the complete cluster of desired length is formed. The following is a general description of a mechanism for automating the process of fixing HFs to each other, also for arranging the HFs in hexagonal shape, for controlling the spacing between the fibers 23, for producing HF clusters 8 of defined length, for fixing both ends 13, 24 of the HF cluster 8 and to do so at specific intervals, as the fibers traverse or move through the fixing center 39.

Hollow fibers entering the fixing compartment (also referred to as a "fixing chamber") 49 through the hexagonal template 35 and 36, retain their hexagonal arrangement, including the spacing between the fibers by the two templates, 35 and 36. Within the fixing compartment 49, in the proximity of the template 36, a dispenser mechanism 37 for adding a fixative to the fibers is provided. It is positioned in a manner that enables it to add a fixative to the external surface of the HF fiber cluster without distorting their hexagonal arrangement, while curing symmetrically around the hollow fibers and cluster to form the desired uniform, hexagonal, arrangement. The fixative addition heads may be rotated to facilitated the uniform addition of the fixative; and or the hollow fiber hexagonal cluster mat be rotated relative to the fixative addition head to facilitate the uniform distribution of fixative around the hollow fibers by overcoming the one directional pull of gravity on the fixative. The fixative may be a fast curing cyanoacrylate that solidifies upon exposure to UV, whose source is directed into the fixing chamber to affect the most effective curing. Addition of liquid cyanoacrylate may be in a bolus or with consecutive smaller injections. Each addition would be solidified by exposure to a UV pulse. The liquid cyanoacrylate would flow between the fibers where it would bond the fibers as it solidifies. Critical to this process is fixing the fibers in the arrangement they emanate from the template. Fixing of the HFs to each other is not limited to cyanoacrylates or other chemical fixatives or potting agents; for example, a substance that undergoes a phase change with temperature may be used. Adding the fixative at one temperature, in liquid form, followed by rapid lowering of temperature, causes solidification. While there are many potential candidates that may be used for this function, the temperatures used in thermal fixation must not damage the fibers. The principles used in 3D printing or modeling may be applicable to the fixing process. Modification to the printing head(s) may be required to enable the deposition of the fixative in the desired form.

Other methods are available which achieve that desired fixing that are obvious to those skilled in the art.

Example 1—Fixing the HFs to Each Other in a Hexagonal Cluster

A nozzle or multiple nozzles 37, from an injector or multiple injectors may be positioned in a manner that would deliver a fixative 24 to the HF cluster in the most efficient manner. There may be various methods for delivering such fixative; in one example, a multi nozzle device 37 (FIGS. 4A, 4B: wires and tubing for fixative are shown 63) is positioned adjacent to the fibers and radially disposed about the fibers at specific intervals. The nozzles, preferably, will be mechanized such that they may move towards the cluster of HFs prior or during fixative addition and retracted after addition. During the fixative addition phase, either the HF cluster can be advanced past the nozzles to affect addition of fixative 24 over a predetermined HF segment length 13; or alternately, the HF cluster may remain stationary while the nozzle assembly 37 advances along the fibers to spread the fixative 24 over a predetermined segment length 13. The fixing compartment 49 (See FIG. 4A, note the dashed line schematically representing the fixing compartment has been omitted in FIG. 4B) will obviously have to accommodate such movement. Furthermore, a mechanism may be provided for rotating the HF cluster 61 (See FIG. 4A) relative to the nozzles (or rotating the nozzles relative to the set HF cluster (not shown)). The fixative may be sprayed on or added to the fibers preferably as, but not limited to, a liquid. A predetermined amount of the fixative is injected either as a single injection, multiple injections or continuously over the selected fiber segment. The fixative addition may achieved by a single pass or multiple passes of the fibers relative to the nozzles, using a single deposition of fixative or multi layered deposition, respectively. The amount of fixative agent injected must be sufficient to coat and uniformly bond a segment 13, 24 (FIG. 1B, 1C) of adjacent HFs, preferably, in a hexagonal shape. Furthermore, it is preferable that the addition of fixative occurs without dripping and without spreading to adjacent components and remains localized to the desired segment of the HF cluster. Preferably, only a small segment 13 of the fibers in a cluster are fixed to each other; that segment may be of any length, but typically in the range between 0.25 and 2 inches. Following addition of the fixative, the nozzles are retracted and the fixative discharge ports on the nozzles protected. Also considered is a mechanism to temporarily reposition individual fiber during fixative addition to optimize the addition and allow full excess of fixative to spaces between the fibers; this is to minimize air gaps or channels between the fibers.

The preferred fixing agent will have a rapid cure rate to maximize the rate of bonding of fibers while minimizing dripping or migration of the fixative from it intended placement. The fixative can be induced to cure rapidly by a curing agent such as electromagnetic radiation, heat, chemicals, or others. One can envision that prior to complete curing or hardening of the fixative, a die (or a mold) is used to further shape the fixed area, particularly, just before the fixative hardens. This may be done while the fixative is still pliable and its adhesive capacity diminished minimizing adhesion to the die. Rapid curing is also desirable for a number of other reasons, including: The faster the cure, the faster the production process. A fast curing agent may also allow control of the potting process, to control the harness of the fixative; i.e., injecting the pot at one temperature and controlling the temperature of the walls of the die for optimum control of the fixative and hardening process. One can also envision more than one fixation cycle, where additional layers of fixative are added to previous deposits; in combination with the die it is possible to form the fixed end of the HF cluster 13 into a defined form, including hexagonal shape with specific side lengths. Additionally, the template 35 and 36 which positions the HFs for the fixing stage may be adapted with an automated mechanism 61 that would reposition or rotate the template 36 and HFs; for example, if a liquid fixative flows in one direction because the pull of gravity, the liquid may be redistributed more evenly around the fibers by rotating the fibers, by equal or less than 180 degrees, once or the rotations may be in one direction than back to the original position or one may perform such forth and back rotations multiple timed.

Considering the indicated requirements for the fixation step, selection of the appropriate fixative or potting material is a critical step. It should be capable of rapidly embedding the fibers in a uniform manner. It should be of sufficient viscosity and properties to allow repeated and rapid fixation of the HF to each other and yet allow shaping the fixed section 13 into a defined form. Cyanoacrylates, epoxies, elastomers, thermoplastics, or other chemical bonding or potting agents, may meet those requirements.

Forming u-Clusters of Defined Length—

Once a fixed segment 13 has been formed at the entrance of the fixing chamber 49 (FIG. 4A), that segment is cut at about its midpoint by a cutting mechanism 38 (wire 62 connected to the mechanism is shown), which may be a laser, a knife, a water jet, etc. The resulting u-cluster 8 can then be removed. The remaining half segment 13 remains connected to the template 36 and within the fixing chamber 49. A retraction mechanism 70 is advanced from its rest position by way of an automated belt and pulley system (or other mechanized system) 78, a distance about the length of a cluster 8, towards the exposed segment 13. A collet like device 71, 77 (FIGS. 4A, 4B and 4C), with a hexagonal opening, advances further forward, in a manner that the segment 13 enters the hexagonal opening in the collet 71, 77. The collet is retracted, with a pneumatic cylinder 69, 73 or some other means. It is retracted into a collet closing mechanism (also referred to as a "collet closer") 78. The collet walls, slit into six equal segments, are forced inward towards the center axis of the collet, causing the collet walls and head to close on the cluster segment 13 six sides. The amount of retraction of the collet into the collet closer 78 determined the extent of collet closure and the grabbing force on the cluster segment; this is a common mechanism used in machining facilities. Alternately, the collet closer can be advanced forward, relative to the collet, causing the same collet closure. Once the cluster segment is secured in the collet head 71, the entire retraction mechanism 70 is retracted to its original rest position by the belt and pulley system 76. A new segment of the HF cluster is positioned in the fixing chamber so a new cluster segment 13 can be formed, as previously described. After the cluster segment is formed, it is cut as before. The retracting mechanism 70 is repositioned to separate the resulting cut cluster segments 13. Simultaneously, the collet is opened by retracting the collet 77 from the collet closer 78. A second cylinder 75 pushes a piston 74, centrally located within the collet, toward the hexagonal opening in the collet to force the u-cluster segment 13 out from the collet head. The complete u-cluster 8 with fixed ends 13 is then free to be picked up or it may be directed by a mechanized system to a storage bin (for example, by way of a conveyor belt moving at a right angle to the completed cluster). Shown are devices 57 for moving the cut cluster and devices 58 for moving the platform under the cut cluster. Someone skilled may make obvious improvement in the described mechanisms.

Example 2—Prefabricated Cluster End Caps

Figure 7:
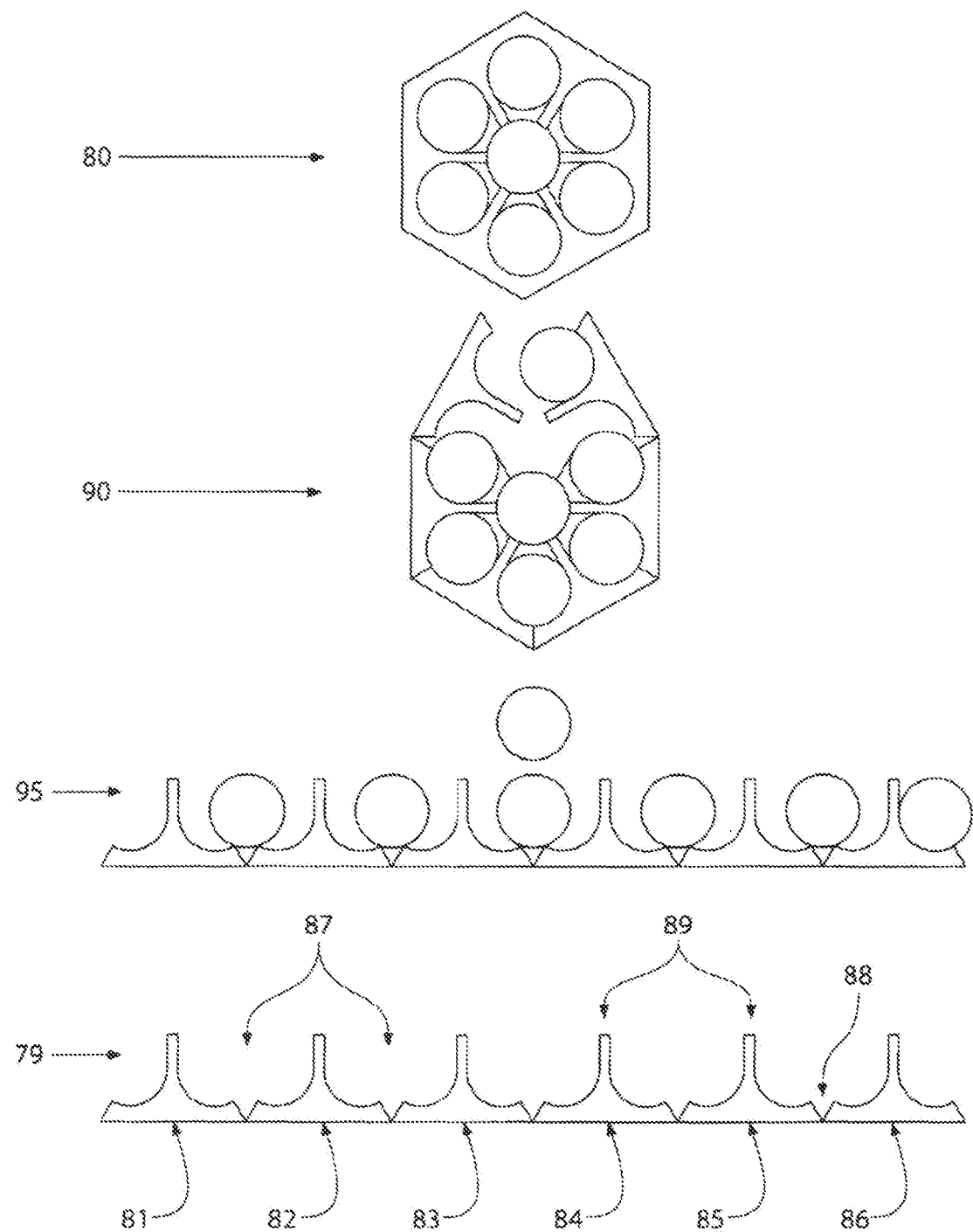
FIG. 7 End views of prefabricated cluster end cap at various stages of assembly.

To form a unit cluster ("u-cluster"), it is conceivable that the "fixing" step to form a hexagonal end cap may be accomplished without applying a liquid fixative, as previously described. The same general results may be achieved using a pre-formed cap, where such cap can be mechanically added or snapped on to the ends of the HFs. The prefabricated cap is positioned along the HF cluster so that it can be mechanically rearranged to encapsulate the fibers and at the same time, assume the desired shape, preferably the hexagonal shape. An example of such a cap is shown in FIG. 7; its two possible configurations, linear cap or segment 79 (L-cap) and folded 80 (F-cap) are shown. The two configurations are inter-convertible as will be shown. The L-cap 79 contains six sub segments, numbered sequentially 81 to 86.

Adjacent segments 81 to 86 (FIG. 7) form "U" shaped grooves, channels or wells 87. The channels are designed to be positioned parallel to the HF strands and in a manner that facilitates receiving and straddling the HF strands 95. The HFs, in turn, are guided into a fixing chamber 49 in the fixing center 39 (FIG. 4A) with a template that aligns the fibers parallel with channels 87 (FIG. 7). In addition to channels 87, the L-cap also contains 5 (or 6) horizontal scores 88, which are preferably located about the midpoint in the base of channels 87, and parallel to them. Such scores facilitate the folding the L-cap segments along the score line in a manner that results in a hexagon shape 80. Posts 89 form the walls of the "U" shaped channels 87; such that, when adjacent segments 81 to 86 are folded or bent along the score lines 88, the posts converge to trap the HFs within the channel 87. The seventh HF positioned above the fiber between segments 83 and 84, at a precise height above it, is trapped in the center as shown in FIG. 7. While only the hexagonal arrangement is described, the same process is obviously applicable to forming other cluster shapes. The process may include addition or spray of an adhesive, fixative or some other appropriate agent into the L-cap 79 so when the cap folds into a hexagonal shape 80 (via intermediate form 90), the fixative inside, post curing, seals the fibers within, and at the same time, facilitates the retention of the resulting hexagonal shape. Whether the HFs are held together in a cluster by addition of a liquid fixative 13, 24 or a prefabricated cluster end cap 80, or some other way, the segment will have to be cut, preferably at the midpoint.

Once a cap has been added to a segment of fibers, creating a hexagonal shape, a cutting mechanism (knife, saw, laser or any other means) may be applied to cut the formed cap and fiber cluster along its midpoint cross section. The resulting lead cluster with both ends capped can then be released and removed. The trailing cluster is advanced for a specified distance, and the process of adding another L-cap is repeated. The entire process can be highly mechanized to generate capped cluster segments at a very high rate, FIGS. 4A and 48.

Various improvements and optimizations are possible to the above described process. In one example, an assembly line is used in which the last steps, involving fixing both ends of the cluster unit are performed vertically. In the vertical position, the flow of fixative will be more uniformly distributed about the center axis of the cluster molds; unlike the horizontal processes where the pull of gravity may distribute the fixative somewhat more to the bottom wall of the cluster chamber.

During or following production of u-clusters, the ends of the cluster units may require plugging to protect the interior of the HFs during subsequent processing; a preferable method for plugging the fibers is by forming a protective thin skin at the ends of the fibers; this should be accomplished without distorting the hexagonal shape or dimensions of the cluster unit. Protecting the ends of the fibers can be readily and rapidly achieved by a number of methods or combination of methods, including heat, ultrasound, chemically, phase change, etc. Formation of a plug must be reversible or amenable for removal at any point of the assembly process. Simply cutting the segment from the end of the cluster or HFC containing the skin or plug is one common option. By using a plug with lower melting temperature than the other components of the cluster or HFC, the plug may be readily removed with heat, and possibly in combination with an adsorptive agent for wicking the melt away from the HF construct. Vacuum may also be used to remove the melt. Such methods as well as others are readily available for plugging and reversibly unplugging the HF ends. The plugging of the HFs can be performed at any point from u-cluster formation to HFC assembly. Preferably, however, but not exclusively, plugging is performed during or after assembly of the u-cluster or after it has been tested for integrity and quality. Plugging the HFs at this early stage of production can facilitate construction of larger clusters.

Clusters—

Figure 6:
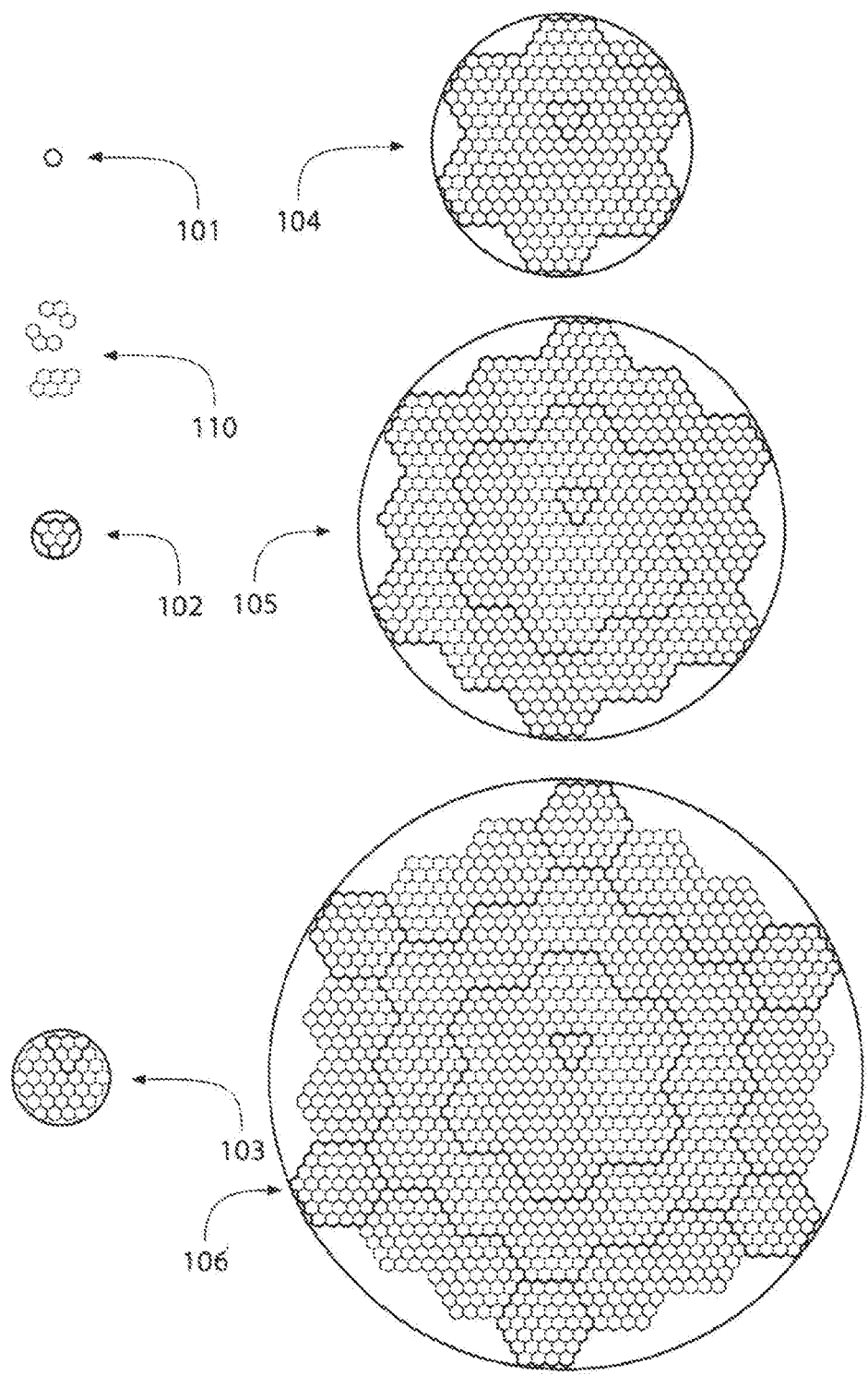
FIG. 6 End views of successively scaled up hexagonal cluster assemblies.

The automation and controlled formation of unit clusters (u-clusters) offers benefits not possible by current HFM production techniques which normally involving random bundling of the fibers. FIG. 6 shows a method of combining u-cluster 101 assemblies to form larger cluster "aggregates". For example, six u-clusters may be combined to form block clusters (b-clusters) 102 which can be further arranged into group clusters (g-clusters) 103, which in turn can be further arranged into even larger super clusters (s-clusters) 104, 105, and so on. The symmetry offered by the hexagonal shaped u-cluster permits orderly arrangement of the HFs to any scale and any desired aggregate shape. The following describe some of the advantages offered by the proposed u-cluster building blocks:

Integrity Testing—Automated Integrity Testing—

As u-clusters are formed, they may be tested by an automated system using any number of available filter integrity testing techniques. For example, the u-clusters ability (or any cluster aggregates ability) to survive autoclave conditions described elsewhere herein may be used as the test conditions. Tests for integrity are known in the art and include, but are not limited to, a bubble point test, a pressure drop test, exposure to vapor comprising particulates, and diffusion tests. In one example, the HFs within the u-cluster are wetted, followed by a bubble point or pressure drop test on each as they come off the assembly line. This provides an immediate and inexpensive way to test each u-cluster. The same integrity tests can also be performed on a larger clusters, i.e., b-cluster, g-cluster, etc., prior to full assembly of the HFCM.

Pre-Shrinking the Clusters—

Preforming clusters whose arrangement fits into the shell end cap receptacles 17, allows preconditioning the fixed area on the clusters or bundles to produce more stable clusters or bundles. For example, preheating the fixed region 13 on the clusters or bundles to anneal that region 13 to remove any stresses in the fixed region 13 will increase the stability of the clusters or bundles. Heating of the fixed region 13 to cause shrinkage of the fixative prior to its insertion into the corresponding receptacle will again eliminate any potential problem due to shrinkage.

Positioning of Fibers—

As indicated, the position of fiber relative to one another, with spacing 23, FIG. 1B, in the hexagonal u-cluster provides the means for arranging the u-cluster in ways that achieve improved filtration results during scale up. For example, this may include optimized filtrate flow from the center of large HFM or HFC to the periphery by spacing the s-clusters in a manner that creates optimal channeling between the interior and exterior of the clusters and HFCM, for optimal flow. Optimal spacing of the fibers and clusters relative to each other may be used to optimize flow between fibers and clusters across the entire cross section of the module.

Optimal Packina—

Hexagons offer an ideal arrangement of high density packing of the hollow fibers.

Other—

Other options become available to achieve unique and improved filtration processes. Cluster units may be packed with a degree of twist within each u-cluster. This is simply achieved during formation of the clusters. For example, in forming a b-cluster, u-clusters can be fixed at one end of the cluster; at the other end however, the u-cluster can be rotated along its long axis in increments. The twist selected may be in increments of 60 degrees for the hexagonal shape. The twist may introduce a vortex to the flow as the liquid traverses the length of the hollow fibers. Natural imperfections in the HF walls or introduction of grooved on the inner wall during fiber spinning may be further used to optimize the vortex effect for improved filtration process. A similar twist may be introduced to fibers in bundles or clusters of any size or shape. The twist may be introduced into round or hexagonal bundles as they are inserted into the shell end caps of the HFCM.

The cluster approach simplifies of the assembly process, and provides for a highly reproducible manufacturing process.

Scale Up:

The assembly of large HFMs is greatly facilitated by the hexagonal unit, u-cluster 101 as shown in the following example: A b-cluster 102 of the form shown in FIG. 6 may be readily assembled from u-clusters 101, as can other cluster forms 110. The process can be readily automated or constructed manually. As shown in FIG. 6, one triangular b-cluster 102 may be assembled from six u-cluster 101 units; this translates, for a 62 cm long fiber with 0.062" OD, to about 0.125 $M^2$ of fiber surface area. Using 7 b-clusters 102 of similar length with the same fibers allows grouping of the b-clusters 102 into g-cluster 103 consisting of 385 fibers, providing about 0.78 $M^2$ of surface area which can be encapsulated in a housing less than 1.5" in diameter.

The filter capacity can then be expanded further by combining 7 g-clusters 103 into a Core arrangement 104 shown in FIG. 6. The shown filter Core pattern, C1-core 104, contains 2695 fibers to produce 5.4 $M^2$ of surface area in a cartridge of about 3.5" in diameter. Further increase in filter size may be achieved by addition of another layer of g-clusters 103 onto the C1-core 104, to form a C2-core 105 pattern; the surface area of which is increased to 14.7 $M^2$ in a cartridge diameter of about 6". With another layer of g-clusters 103 added to the C2-core 104 to form the C3 core, the surface area is increased to about 29 $M^2$ in cartridge diameter of about 8". One can continue to build even larger cartridges in a similar organized manner, noting the retention of the base hexagonal shape of successively larger cores: this, however, does not exclude the possibility of adding or subtracting clusters to and from larger clusters or core in order to achieve a HF arrangement patterns other than hexagonal; for instance, circular, rectangular or other polygons or shapes, rather than hexagonal. Table 1 provides a more detailed description of some of the various HF cluster configurations schematically illustrated in FIG. 6:

TABLE 1

| Reference # | Radius | Hol-Up Volume (mL) | Surface Area ($M^2$) | # of Fibers |
|---|---|---|---|---|
|  |  | 0.5 | 0.002 | One 62 cm fiber |
| 101 | 0.101 | 3.5 | 0.014 | Hexagon of 7 fibers |
| 102 | 0.307 | 31.5 | 0.125 | 9 × hexagon of 7 = 63 fibers |
| 103 | 0.612 | 189 | 0.775 | 385 fibers |
| 104 | 1.675 | 1323 | 5.4 | 2695 fibers |
| 105 | 2.757 | 3591 | 14.7 | 7315 fibers |
| 106 | 3.768 | 6993 | 28.5 | 14245 fibers |

HFCM shell end caps, 11 and 12, FIGS. 2B-2G and 5B-5E, facilitate the above assembly by organizing the clusters or bundles during construction of the HFCM, by providing structural support to the assembly by maintaining the appropriate spacing between bundles.

As filter size is increased, the flow pattern and resistance to flow from the center of the cluster or core to their periphery may change. The proposed methods for constructing large filters provide the means to address this issue. As indicated, the spacing 23, FIG. 1B, of adjacent HFs in a u-cluster is achieved during its production. The spacing between u-clusters in a b-cluster can also be set with an appropriate template; that spacing is determined by the requirements of the filtration process, small gaps between u-clusters for slow harvest rates, larger gaps for more rapid filtrate harvest rates. Similarly, during scale up from the b-cluster to the g-cluster and to larger cores, the spacing between clusters are selected to achieve optimal flow from all fibers to the periphery of the cluster or core; the spacing 29 between openings 17 and corresponding bundles illustrate such flow channels. Bundling of HFs in tight bundles, as is currently common, limits such control of flow from the center of the bundle to its periphery. In tight bundles, the more peripheral HFs can offer resistance to flow of filtrate from the more interior fibers. The filtrate production rate from all HFs becomes non-homogeneous. A fraction of the HFs will carry the filtration load to a greater extent than other fibers, which can lead to their early failure. In other words, the full capacity of the filter is not realized. In organizing the fibers as described, such non-uniformity in HF filtration is minimized and the full capacity of the HFM is more closely realized. While hexagonal cluster units are a preferred embodiment of the cluster unit, other shapes are also possible. A rectangular cluster unit may be preferable in some cases. A triangular cluster may be useful in other cases. It is obvious that clusters in shapes of various polygons are possible using the described process.

Assembly of Clusters into HFC:

Assembly of clusters into the more functional HFC or HFM requires potting of the cluster in a HFCM shell end cap 11 and 12. Unlike previous procedures, where the option for organizing the fibers and bundle is more limited, the proposed geometric patterns offer the possibility for accurate arrangement of the fibers within the HFCM. For example, by using a shell end-cap 11 which also serves as a template, as shown in FIGS. 5B-5E, the HF bundles can be arranged into the desired patterns; the shell end caps 11 and 12 that contain hexagonal receptacles or openings 17 arranged in the desired pattern and spaced appropriately 29 from each other; hexagonal bundles 8 (such as g-bundles 103, see FIG. 6, for example) whose ends 13 are inserted into the said hexagonal receptacles 17, define the pattern of bundles in the shell end-cap 11 and 12. Potting the bundle ends within the receptacles fixes that pattern. Housing 10 between the two end-caps encapsulate the hollow fiber to form a HFC. The above described process offers a number of improvements which can greatly increase the quality and reliability of the final HFC or HFM. The methods will facilitate production of large HFM and decrease their cost. Some of those benefits follow.

1. Minimize the Use of Incompatible Materials:

Many of the current commercially supplied HFMs or HFCs use polysulfone for the shell or other parts of the housing; simply, the material provides an excellent structural support, great chemical inertness, high operating temperature, as well as other benefits. Some of the same physical and chemical properties which make polysulfone such a good structural material also make it a very poor potting agent; therefore, other materials have been used for that purpose. Epoxies and polyurethane are perhaps the most common; they can be poured as a low viscosity liquid that readily flows between the hollow fibers, to immerse the fibers in a uniform manner; the material is induced to solidify by pre-addition of a curing agent, by heat, light or some other means. The rate of cure or solidification can thus be controlled to form a highly inert, heat stable material that can be machined, and further manipulated as needed. Such potting materials are highly customizable per user's needs; nevertheless, in spite those benefits, they are not ideal for the construction of large HFM.

Epoxy, for example, as potting material requires that it not only embed the HFs, but also requires that it bond to the wall of the polysulfone shell. While one may select an epoxy with very similar coefficient of expansion as polysulfone, it typically is not exact, nor is that expansion differential maintained over the entire temperature range to which both materials may be commonly exposed. Furthermore, the transition or curing of epoxy from a liquid state to a solid may result in significant dimensional changes to the material; that change or shrinkage upon polymerization, the extent of which may increase by heating. While such shrinkage may be small and insignificant when used to construct small HFMs with small potting inner diameters, it can be greatly amplified and become quite significant as potting diameters increase. The result of which may be cracking in the epoxy or separation of the epoxy from the polysulfone to which it is bonded.

Bonding integrity between the potting agent and the structural polysulfone shell end cap (and shell) must be retained to maintain separation been the filtrate and retentate chambers. Yet, it is observed that when using two different materials, the bonding strength between them can be greatly affected with increased filter size and the greater dimensional change in one material over another the greater possibility of bond failure. To maximize this bond, the cartridge receiving ends of the polysulfone shell end cap are roughed or shaped to allow maximum grip with the pot; nevertheless, at large scale, the combined effects of an increased shrinkage increment and the effect of temperature on softening the bond between epoxy and polysulfone and may cause the bond to fail. It is also possible that following the heating and cooling cycle, the polysulfone does not shrink, but the epoxy does. This can occur without separating between epoxy and polysulfone; however, this case, the stress may be stored in the solidified epoxy, leading to potential stress fractures within the epoxy only, potentially leading to the HFM failure.

One may conclude that epoxy and polysulfone are not ideally compatible for construction of large filters. The problems associated with the use of two incompatible materials can be greatly reduced or eliminated by using compatible, preferably identical, materials in the construction of the HFM; i.e., use polysulfone for the shell of the HFM and for constructing the shell end caps of the HFCM.

2. Method of Construction of Large HFM:

The use of "compatible" materials for the construction of large HFMs becomes an essential part of the construction; for example, using a polysulfone shell and substituting polysulfone for epoxy to form the HFC end-caps and for embedding the HFs in the same end-cap. Using polysulfone to form the shell 10 as well as the shell end-cap 11 and 12 results in a structure in which both these critical parts expand and contract at the same rate; since end-cap and shell are formed from mostly the "same" material, they will behave similarly at all usable temperatures, (not ones that melt a component), pressures, and times; including those reached during both in-line and off-line production processes of steam sterilization (typically in the range of 121 C to 125 C at 15 psi to 25 psi for 3 min to 45 min; settings are interdependent), dry heat autoclave (typically in the range of 121 C to 190 C at times of 6 min to 12 hrs. depending on the temperature setting), or chemical vapor autoclave (typically in the range of 132 C at 20-40 psi for 20 min). This would greatly minimize fractures or failure between bonded surfaces.

For purposes of this application and its claims, the test for whether a cartridge resists cracking is whether it does so when exposed to a temperature of 121-125 degrees Centigrade, at a pressure of 15-17 psi for 30 to 60 minutes.

Unlike epoxy, however, polysulfone cannot be easily poured to pot polysulfone HFs; therefore, a somewhat modified method is used to achieve the construction of the HFC. It involves using a polysulfone disk, about the diameter of the HFM shell 10, to form shell end caps 11 and 12, where the shell end cap contains receptacles 17 or openings that run through the length of the shell end cap. See FIGS. 2B-2F and 5B-E. The shapes and spacing of the receptacles can be controlled with great accuracy by molding or machining the end-caps. Such openings 17 can, therefore, serve as receptacles for accepting HF clusters or bundles 8. Typically, but not exclusively HF cluster units or bundle fixed ends 13 would consist of similar shapes and dimensions to the indicated receptacles. In addition to the indicated receptacles, it is possible to form or machine a groove 16 in the shell end cap into which the ends of the shell 10 may be inserted. The shell can, therefore, be firmly anchored in the shell end-cap by mechanical means or with an adhesive and sealed with a gasket, "O" ring, or adhesive. The other end of the shell can be similarly anchored to the second shell end-cap. The resulting structure, in addition to simplifying construction, forms a very stable structure that is not readily susceptible to distortion. The receptacles at the two shell end caps may be aligned in the HFC assembly. Clusters may be inserted at one end through the shell end-cap 11 opening 17, through the shell housing 10, then into the juxtaposed receptacles 17 within the shell end-cap 12 at the other end of the shell. The cluster or bundle length can be the same length as the distance between shell end caps or slightly longer; therefore, depending on the lengths of the cluster units, they may be flush with the external surface of the shell end-caps or slightly extend beyond the outer surfaces of the shell end-caps. Similarly, other clusters may be added, filling all the cavities in the shell end cap. The gap between the receptacle walls 18 and the potted sides of the cluster or bundle 13 may be filled with an adhesive capable of flowing into that gap then solidifying, sealing the gap, and anchoring the cluster. Small amounts of the sealant, such as epoxy, may be used in this case; its undesired effects, like shrinkage, are greatly diminished by the small volume of filler required and the narrow gap between clusters potted ends 13 and receptacles walls 18. The previously described flaws in using epoxy are diminished to a very large extent. Furthermore, because of the small volume of potting material required and the nature of the construct, each cluster and receptacles pair can be viewed as a small HFC. Each cluster with ends confined to their respective receptacles is similar to a small filter, which exhibits minimal distortions, normally observed in large HFM. Insertion of bundles into the HFC shell end cap receptacles 17 at one end (i.e., 11), allows anchoring the trailing fixed bundle end 13 in the insertion receptacle. The leading fixed bundle end 13 may therefore be slightly rotated prior to insertion into the receptacle 17 in the shell end cap 12 at the other end of the HFC.

Uniform addition of an adhesive sealant into the gap between bundle wall 13 and cavity walls 18 may be achieved in various ways. In one method, the ends of the HFs are plugged with a thin layer of sealant, plug, or "skin" that is impenetrable to the selected potting agent. Such plugging of HF may take place during the production of the clusters or at some other point. The gaps between cluster sides 13 and end-cap cavity walls 18 may be simply filled by dipping the assembly in a specified volume of potting agent. The pot, being a liquid, flows into the gaps, by capillary action, but not into the plugged HFs. Excess sealant may be drained prior to its solidification, leaving only the sealant within the said gaps. Following solidification, clusters or bundles that extend beyond the end-caps, may be cut flush with the end-cap external surface. The length of the segment cut should be sufficient to expose the HF end openings. If the bundles are the same length as the HFCM, then it is possible to cut a section of the fixed bundle end sufficiently to remove the HF plug section and expose the open HF ends.

There are other potential methods for inserting and plugging the bundle ends in their respective receptacles 17. These include the use of "O" rings. It may include adding the potting agent from inside the housing 10 or shell end cap surface 21 on to the bundle end 13 or into the receptacle 17 before or after the bundles are inserted into their respective receptacles. The potting can be from surface 20, 21 or both, FIGS. 2B and 2E.

3. Scale Up:

The above method of construction of large HFCM is not limited to any particular size. It simply provides a method for constructing large HFCM that is more efficient and reliable than previous techniques. It also provides the means for increasing the size of large HFM beyond what is possible with current techniques. One may, for example, use stainless steel (SS) for the shell, shell end cap or other structural components. SS can provide the structural support for a filter much larger than possible using current techniques. The receptacles in the shell end cap would remain as previously described. Clusters units or bundles would be inserted into the their respective cavities in the shell end caps; as before, because the very small volume of adhesive used between the bundle and the cavity wall, expansion and contraction of the adhesive or sealant would be minimal. It is obvious that the potting agent would have properties compatible with the construction requirements; i.e., it should be compatible with bonding to SS if SS components are used; it should be compatible with the temperature requirements of the HFM; there must be compatibility in the expansion and contraction properties of the materials; the materials must have the physical properties, for example, that would possess the strength to withstand the stress requirements of the process. It is also clear that other measures are possible: using an elastomeric potting material or adhesive, sizing the cluster unit and the spaces between the cavities, insertion of support columns within the HFC, between cluster units to prevent deformation of the structure under extreme operating conditions.

Figure 8:
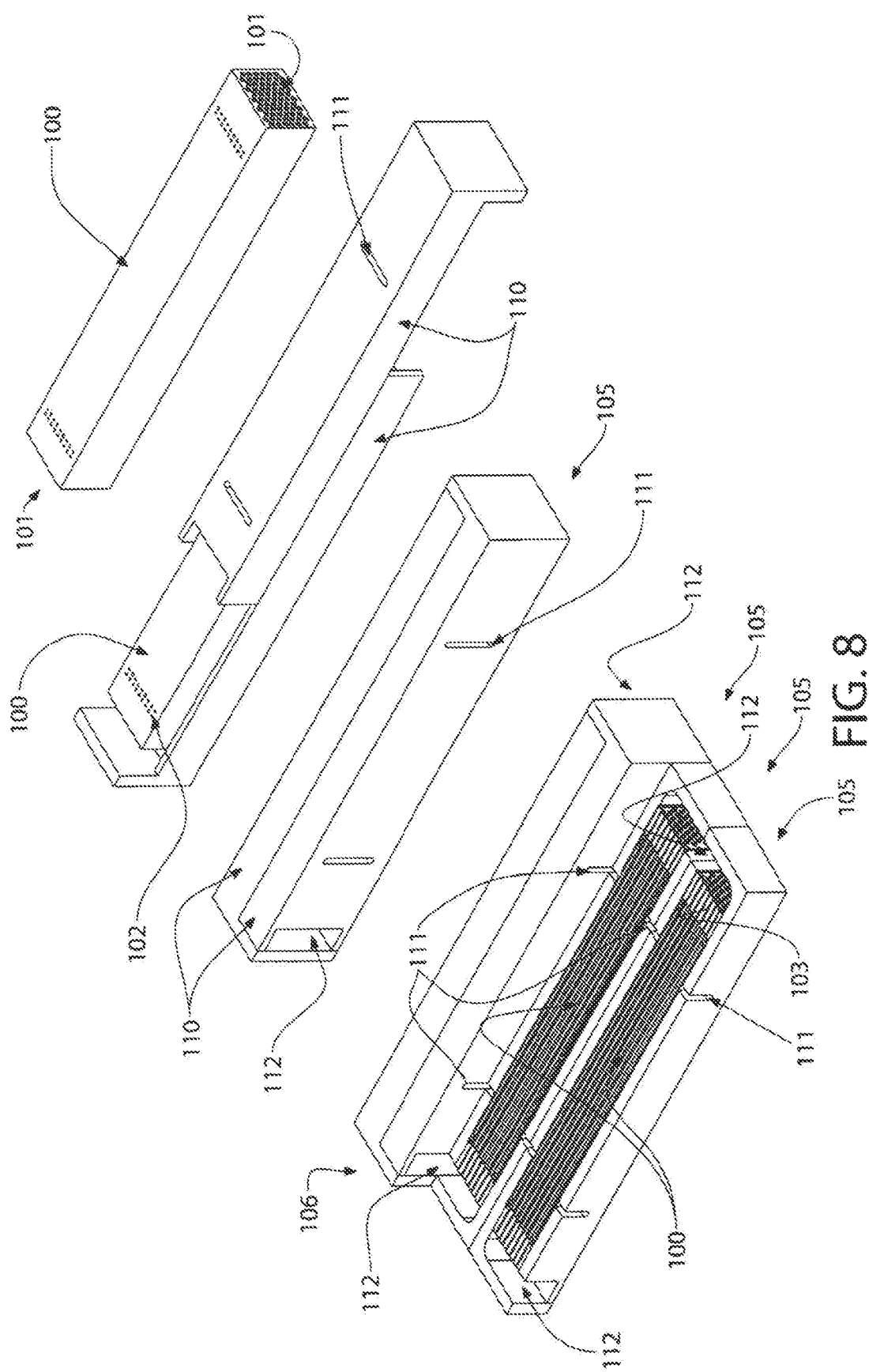
FIG. 8 Perspective views of a rectangular module, its component parts, and an assembly, partially cut away for illustrative purposes, of a three module stacked assembly.

4. Different Configurations:

While the focus of the invention has been on hexagonal arrangement of clusters, it is obvious that the process described is not limited exclusively to hexagons. Similar procedures may be applied to formation of triangles, squares, pentagons, or any other form. The number of fibers in each cluster may also be varied from one to any number desired or limited by the process used to form such clusters. The process described does not only apply to round HFMs or HFCs, it can also be applied to forming square filtration modules or other shapes; including, additionally, plate and frame type of modules where the flat filter sheet is replaced by clusters of hollow fibers arranged linearly to form the equivalent shape of a plate, one example of which is shown in FIG. 8. In turn, such HF-plates (also referred to as "cartridge shell") 100 can then be stacked like the "plate and frame" arrangement 106. (Numbers 100 through 112 referred to in the following paragraph are specific to FIG. 8).

The HF clusters or bundle ends will be potted to both ends of the rectangular cartridge shell ("shell ends") 101, where the ends of the shell 101 contain end caps with openings or receptacles to receive and pot the bundle or cluster ends, as described above. The rectangular HF-plates will have side ports 102 for allowing filtrate to flow from inside the rectangular HF plates (shell) 100. Such HF plates (shell) can then be inserted into housing 105, which housing is formed by two housing components (housing plates) 110. In order to keep the filtrate separated from the retentate fluid, the housing component(s) which receives the rectangular HF plate 100 contact those plates in a leak proof manner at location(s) (such as the perimeter of the fixed are of a cluster segment; gaskets or other sealing means can be used). The two housing components (plates) 110 are constructed to form a leak proof enclosure for the HF plate (for example, gasketing can be used). Housing (also referred to as the "rectangular module") 105 contains channels or ports 112 that direct fluid into or from the lumens of hollow fibers. Such channels 112 may be connected in a manner that allows fluid emanating from the hollow fibers in one rectangular module 105 into an adjacent rectangular module 105; such stacking may be repeated forming a plate and frame arrangement 106 of multiple rectangular modules 105. Port or channel 112 forms a fluid connection between such rectangular modules, connecting the hollow fibers within the rectangular HF plates in series. The plate and frame stack 106 will obviously contain an exit module (the last module in the series) which will also direct the fluid from the plate and frame stack 106. The sides of the rectangular modules 105 contain ports 111 that register with similar ports on adjacent rectangular modules 105 forming a passageway for harvesting the filtrate generated within the plate and frame stack. The HF plates and rectangular modules may be stacked in series, parallel, or a combination of the two. The described plate arrangement can be reconfigured by those who are skilled in the operation of such filters to optimize the results of the described system.

What is claimed:

1. A stackable rectangular hollow fiber module, said module stackable with other modules of identical structure, said module comprising a rectangular housing, said housing enclosing a rectangular cartridge, wherein said housing and cartridge are each characterized by two rectangular end walls, joined by four rectangular side walls that parallel each other, wherein multiple cartridges may be included in each housing, wherein said cartridge is characterized by two rectangular ends and four rectangular sides and enclosing a bundle of hollow fibers, said bundle being a bundle of hollow fiber clusters, wherein each of two opposite cartridge side walls have at least one cartridge filtrate port, the filtrate port or ports on one wall spaced along that wall in the same manner as the filtrate port or ports on the opposite wall, said filtrate port or ports allowing exit or entry of filtrate, wherein each of two opposite housing side walls have at least one housing filtrate port each housing filtrate port positioned so that it aligns with a cartridge filtrate port, wherein each of said two opposite housing walls have a housing retentate port, wherein a first housing retentate port is positioned so that it opens into a channel that allows retentate flow from outside the housing to a first end of the bundle thereby allowing retentate flow from said first end of the bundle, into and through the bundle, and then to a second housing retentate port located in the wall opposite the one that has the first housing retentate port, from which second housing retentate port it exits the housing.

2. An assembly of two or more rectangular modules of claim 1, wherein the modules are aligned so that the housing filtrate ports of a first module are adjacent to and directly opposite the housing filtrate ports of a second module and wherein a housing retentate port of said first module is adjacent to and directly opposite a housing retentate port of said second module.

3. A stackable rectangular hollow fiber module of claim 1 wherein the clusters are unit clusters of seven fibers.

4. An assembly of two or more rectangular modules of claim 3, wherein the modules are aligned so that the housing filtrate ports of a first module are adjacent to and directly opposite the housing filtrate ports of a second module and wherein a housing retentate port of said first module is adjacent to and directly opposite a housing retentate port of said second module.

5. A rectangular cartridge wherein a bundle or multiple bundles are laid parallel next to each other and optionally stacked in one or more layers, said bundle or each of the multiple bundles comprising at least one hollow fiber cluster, wherein the rectangular cartridge is characterized by two rectangular ends, two opposing rectangular sides that do not have filtrate ports, and two opposing rectangular sides that each comprise at least one pair of filtrate ports, such that the filtrate ports on one wall of the pair are spaced along their rectangular side in the same manner as the filtrate ports on the opposite rectangular side.

6. A rectangular cartridge of claim 5 wherein the cluster is a unit cluster consisting of seven hollow fibers.

* * * * *